United States Patent
Fernandez

(10) Patent No.: US 10,586,251 B2
(45) Date of Patent: Mar. 10, 2020

(54) CONSUMER INTERACTION USING PROXIMITY EVENTS

(71) Applicant: David Fernandez, Escondido, CA (US)

(72) Inventor: David Fernandez, Escondido, CA (US)

(73) Assignee: Netclearance Systems, Inc., Escondido, CA (US)

( * ) Notice: Subject to any disclaimer, the term of this patent is extended or adjusted under 35 U.S.C. 154(b) by 9 days.

(21) Appl. No.: 13/752,213

(22) Filed: Jan. 28, 2013

(65) Prior Publication Data

US 2013/0226704 A1    Aug. 29, 2013

Related U.S. Application Data

(60) Provisional application No. 61/603,065, filed on Feb. 24, 2012.

(51) Int. Cl.
*G06Q 30/00* (2012.01)
*G06Q 30/02* (2012.01)
*H04W 4/021* (2018.01)
*H04W 4/029* (2018.01)

(52) U.S. Cl.
CPC ..... *G06Q 30/0261* (2013.01); *G06Q 30/0267* (2013.01); *G06Q 30/0281* (2013.01); *H04W 4/021* (2013.01); *H04W 4/029* (2018.02)

(58) Field of Classification Search
CPC ............... G06Q 30/02; G06Q 30/0214; G06Q 30/0277; G06Q 30/08; G06Q 30/0601; G06Q 30/0207; G06Q 30/0253; G06Q 30/0267; G06Q 30/0611; G06Q 30/0251; G06Q 30/0236; G06Q 30/0224; G06Q 30/0239; G06Q 30/0255; G06Q 30/0631; G06Q 30/0222; G06Q 30/0261; G06Q 30/0281; G06Q 20/3224
USPC ........... 705/14.1, 14.49, 14.64, 14.25, 14.36, 705/14.39, 14.51, 14.67, 14.16, 14.23, 705/14.45, 14.53, 14.66, 14.69, 14.71, 705/14.73, 14.4, 14.58, 14.62, 14.63
See application file for complete search history.

(56) References Cited

U.S. PATENT DOCUMENTS

| | | | | |
|---|---|---|---|---|
| 6,776,334 | B1 * | 8/2004 | Garg | 235/384 |
| 6,907,238 | B2 * | 6/2005 | Leung | 455/404.1 |
| 7,907,571 | B2 * | 3/2011 | Raghothaman et al. | 370/331 |
| 8,082,187 | B2 * | 12/2011 | Abhari et al. | 705/26.7 |
| 8,484,076 | B2 | 7/2013 | Roberts et al. | |

(Continued)

OTHER PUBLICATIONS

Yungeun Kim et al., Smartphone-Based Collaborative and Autonomous Radio Fingerprinting, IEEE Transactions on Systems, Man, and Cybernetics, Part C, Jan. 2012, 12 pages, vol. 42 Issue 1, IEEE.

*Primary Examiner* — Alvin L Brown
(74) *Attorney, Agent, or Firm* — Genius Patent APC; Bruce Hare

(57) ABSTRACT

A system adapted to identify and react to proximity events is described. The system includes: a set of sensors, each sensor in the set adapted to transmit a wireless beacon signal, the beacon signal including a sensor ID associated with the sensor; at least one mobile device adapted to receive the wireless beacon signal from the sensor and provide a location of the mobile device; and a server adapted to receive the location of the mobile device and the sensor ID, generate instructions based at least partly on the received information, and send the instructions to the mobile device.

20 Claims, 22 Drawing Sheets

(56) References Cited

U.S. PATENT DOCUMENTS

| | | | |
|---|---|---|---|
| 8,489,112 B2 | 7/2013 | Roeding et al. | |
| 8,583,475 B2 | 11/2013 | Wills | |
| 2004/0203566 A1* | 10/2004 | Leung | 455/404.1 |
| 2006/0287813 A1 | 12/2006 | Quigley | |
| 2008/0040219 A1 | 2/2008 | Kim et al. | |
| 2008/0091541 A1 | 4/2008 | Law et al. | |
| 2008/0109317 A1* | 5/2008 | Singh | 705/14 |
| 2008/0214151 A1* | 9/2008 | Ramer et al. | 455/414.1 |
| 2009/0204354 A1* | 8/2009 | Davis | H04W 84/18 702/89 |
| 2009/0222358 A1* | 9/2009 | Bednarek | 705/27 |
| 2009/0224909 A1* | 9/2009 | Derrick et al. | 340/539.13 |
| 2009/0281852 A1* | 11/2009 | Abhari et al. | 705/7 |
| 2010/0036772 A1* | 2/2010 | Arceneaux | 705/50 |
| 2010/0185504 A1* | 7/2010 | Rajan et al. | 705/14.13 |
| 2011/0028093 A1* | 2/2011 | Patel et al. | 455/41.2 |
| 2011/0028160 A1* | 2/2011 | Roeding et al. | 455/456.1 |
| 2011/0029362 A1* | 2/2011 | Roeding et al. | 705/14.13 |
| 2011/0029364 A1* | 2/2011 | Roeding et al. | 705/14.16 |
| 2011/0178863 A1 | 7/2011 | Daigle | |
| 2011/0179064 A1 | 7/2011 | Russo | |
| 2011/0191438 A1 | 8/2011 | Huibers et al. | |
| 2011/0238476 A1* | 9/2011 | Carr et al. | 705/14.25 |
| 2011/0302017 A1* | 12/2011 | Marti et al. | 705/14.26 |
| 2012/0047011 A1* | 2/2012 | Rippetoe et al. | 705/14.45 |
| 2012/0089460 A1* | 4/2012 | Abhari et al. | 705/14.53 |
| 2012/0116861 A1 | 5/2012 | Dobyns | |
| 2012/0329132 A1* | 12/2012 | Bloom et al. | 435/193 |
| 2013/0030875 A1* | 1/2013 | Lee | G06Q 10/06311 705/7.38 |
| 2013/0058796 A1 | 3/2013 | Gerz et al. | |
| 2013/0268353 A1 | 10/2013 | Zeto, III et al. | |
| 2013/0275198 A1 | 10/2013 | Zeto, III et al. | |
| 2013/0297422 A1 | 11/2013 | Hunter et al. | |
| 2014/0087752 A1 | 3/2014 | Zhu et al. | |
| 2014/0188658 A1* | 7/2014 | Li | G06Q 30/0633 705/26.8 |

* cited by examiner

CONSUMER INTERACTION USING PROXIMITY EVENTS

CROSS-REFERENCE TO RELATED APPLICATIONS

This application claims priority to U.S. Provisional Patent Application Ser. No. 61/603,065, filed on Feb. 24, 2012.

BACKGROUND

Mobile devices (e.g., smart phones, tablets, personal computers, netbooks, etc.) are ubiquitous in society. Many consumers may carry, for example, a smart phone on their person when out in public. Such consumers may also use the smart phone to execute various applications (or "apps"). These consumers may also frequent various retail establishments such as grocery stores, clothing stores, restaurants, etc.

Such retail establishments typically make offers to these consumers using methods such as print advertising, online advertising, email promotions, coupons, etc. Such offers are not user-specific, and are not based on a consumer's location relative to a retail establishment, product, food item, and/or other retail items.

Thus there is a need for a solution that allows various establishments to interact with potential customers using a mobile device application, where the interaction is based on the proximity of each customer to a particular location and/or any available information regarding the customer.

BRIEF SUMMARY

Some embodiments may provide a way for sellers and/or marketers to reach consumers based on a consumer's proximity to a particular location. Such a particular location may be defined by a sensor that emits a beacon signal in one or more directions within a defined range. The beacon signal may be received by a user device. Such a user device may execute a client application that communicates with a server application. Such communication may involve sending data and/or commands to and/or from each application. In some embodiments, the client application may be adapted to automatically perform various operations based at least partly on commands received from the server application.

Some embodiments may provide a way to collect location information. A sensor that emits a beacon signal may be attached to a person, pet, or moveable object. Various user devices may receive the beacon signal. Such user devices may include features that allow each user device to ascertain its own location. Each user device that is able to ascertain a location when receiving the beacon signal may send the information to a server application that is able to collect various locations associated with a particular sensor. The server application may be able to track or locate the sensor based at least partly on the collected data.

Alternatively, in some embodiments the location of the sensor (and thus the user device) may be determined using a database accessible to the server application. Such a database may include stored location information associated with each sensor in the database. Such stored location information may be provided by, for instance, a user (e.g., a retailer placing a sensor in a store may upload to the database a location of the store and an ID of the sensor), user devices that have previously perceived the sensor and provided a location, etc.

One exemplary embodiment provides a system adapted to identify and react to proximity events. The system includes: a set of sensors, each sensor in the set adapted to transmit a wireless beacon signal, the beacon signal including a sensor ID associated with the sensor; at least one mobile device adapted to receive the wireless beacon signal from the sensor and provide a location of the mobile device; and a server adapted to receive the location of the mobile device and the sensor ID, generate instructions based at least partly on the received information, and send the instructions to the mobile device.

Another exemplary embodiment provides a client application adapted to be executed by a device in order to identify and manage proximity events. The client application includes: a receiver module adapted to receive a beacon signal; a communication module adapted to communicate with a server application based at least partly on the received beacon signal; and a control module adapted to manipulate functionality of the device based at least partly on a first set of communications received from the server application.

Yet another exemplary embodiment provides a method adapted to allow a consumer to receive marketing offers based on proximity events. The method includes: detecting a beacon signal emitted from a wireless sensor, where the beacon signal includes a sensor ID; sending a request to an application server; and receiving instructions from the application server.

The preceding Summary is intended to serve as a brief introduction to some embodiments of the invention. It is not meant to be an introduction or overview of all inventive subject matter disclosed in this document. The Detailed Description that follows and the Drawings (or "Figures" or "FIGS.") that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matter is not to be limited by the illustrative details in the Summary, Detailed Description and the Drawings, but rather is to be defined by the appended claims, because the claimed subject matter may be embodied in other specific forms without departing from the spirit of the invention.

BRIEF DESCRIPTION OF THE DRAWINGS

The novel features of the invention are set forth in the appended claims. However, for purpose of explanation, several embodiments of the invention are set forth in the following drawings.

DETAILED DESCRIPTION

Figure 1:
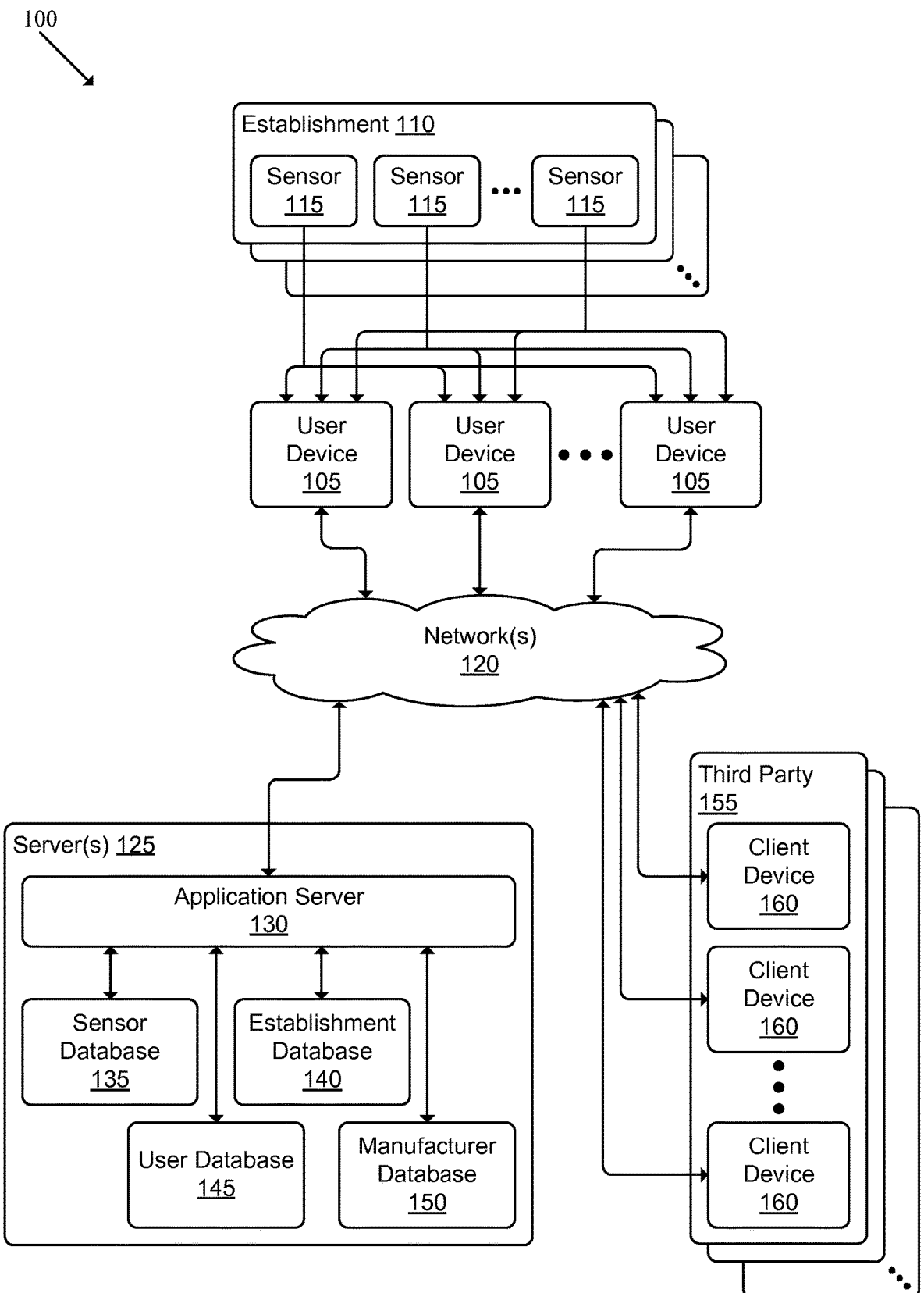
FIG. 1 illustrates a schematic block diagram of a conceptual proximity event system according to an exemplary embodiment of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Broadly, an embodiment of the present invention generally provides a way to monitor and respond to location information. Such location information may include the location of a sensor capable of providing a beacon signal. A mobile device (and/or other appropriate device) running an application may be able to determine whether the device is within a certain proximity of the sensor. When the application determines that the device is within the certain proximity of the sensor, the application may cause the device to communicate with a server. The server may receive information from the application (e.g., location of the device, ID of the sensor, etc.). Based on such information, the server may send sets of instructions to the application, where the sets of instructions may cause the mobile device to perform various operations (e.g., place a call, send a text message, display a marketing offer, etc.).

Some embodiments may include an apparatus and method whereby a mobile application running on a portable computing device such as a smartphone or tablet can react, according to instructions provided by a remote application running on a server computer, to the proximity of a wireless sensor that transmits low-power beacon signals to announce its presence at predetermined intervals.

Some embodiments may be able to control behavior of a mobile application when the portable device running the application comes within a proximity threshold of a stand-alone wireless sensor.

Some embodiments may include a method to provide targeted advertisement, such as coupons or sale offers to portable computing devices, such that the coupons and/or offers may be used by a mobile subscriber associated with the portable computing device.

Some embodiments may include a method to locate an untethered wireless sensor by its proximity to a portable computing device with more powerful location capabilities such as Global Positioning System (GPS) or a network-based locating capability. The sensor may be attached to an object, animal or person and hence its location may be unknown, but able to be determined using the portable computing device.

Several more detailed embodiments of the invention are described in the sections below. Section I provides a conceptual description of a system architecture used by some embodiments. Section II then describes various conceptual software architectures used by some embodiments. Next, Section III describes various methods of operation used by some embodiments. Section IV then describes various use cases that may be implemented using some embodiments. Next, Section V describes a process used to define various applications of some embodiments. Lastly, Section VI describes a computer system which implements some of the embodiments of the invention.

I. System Architecture

FIG. 1 illustrates a schematic block diagram of a conceptual system 100 according to an exemplary embodiment of the invention. Specifically, this figure shows various communication pathways among the elements of the system 100. As shown, the system may include one or more user devices 105, one or more establishments 110, each including one or more sensors 115, one or more networks 120, one or more servers 125, the servers providing an application server 130, a sensor database 135, an establishment database 140, a user database 145, and a manufacturer database 150, and one or more third parties 155, each third party including one or more client devices 160.

Each user device (or mobile device) 105 may be capable of communicating with one or more network(s) 120 and one or more sensors 115. In addition, each user device 105 may be able to provide information to a user and/or receive inputs from a user. Each user device may include one or more processors, memory, user interface elements, and/or other appropriate elements. Such a user device may be, for instance, a mobile phone, a tablet, a portable computer, etc.

Each user device may include one or more display elements (e.g., a screen, indication lights, etc.) and various user input elements (e.g., a keypad, touchscreen, etc.).

Each establishment 110 may be a retail establishment (e.g., a store, restaurant, etc.), a building (e.g., a museum, library, etc.), or some defined area (e.g., a parking lot, a sports field, etc.). Each establishment may have one or more sensors 115 placed so as to define one or more zones associated with the establishment.

Each sensor 115 may include various wireless communication features. Such wireless communication features may include radio frequency communication features and may use various appropriate formats (e.g., Bluetooth, WiFi, etc.). The sensors may be able to transmit a beacon signal that is able to be received by a user device 105. The beacon signal may include a unique sensor identifier and may be transmitted using short-range radio frequency signals at preset intervals. The sensor 115 will be described in more detail in reference to FIGS. 3-4 below. In some embodiments, a sensor 115 may be attached to, for instance, an object, pet, person, etc.

The network(s) 120 may include one or more local-area networks (e.g., a wireless network, an Ethernet network, etc.), wide-area networks and/or networks of networks (e.g., the Internet). The networks may allow data and/or instructions to be passed among the various components of the system.

The server(s) 125 may include one or more electronic devices that are able to execute instructions and/or process data. The application server 130 may be able to pass data and/or instructions among one or more databases 135-150 and/or one or more network(s) 120. The databases 135-150 may be able to store data and/or instructions. Various example data structures will be described in reference to FIG. 11 below.

Each third party 155 may be a non-consumer individual or entity that accesses the system 100. Such entities may include, for example, retail chains, product manufacturers, application developers, etc. Each third party 155 may include one or more client devices 160 that may allow the third party 155 to access system 100 through network(s) 120. Such a client device 160 may be, for instance, a personal computer, a notebook computer, a mobile phone, etc.

During operation, a user device 105 that moves within a particular proximity of a sensor 115 may receive a beacon signal from the sensor. The user device may then execute a client-side application that allows the user device to send data and/or instructions to the server(s) 125 via the network 120. Such data and instructions may include information regarding the proximity event (e.g., an identifier of the sensor). The server(s) 125 may process the received data and/or instructions and determine various potential responses. Such responses may be based at least partly on the location of the sensor 115, an establishment 110 associated with the sensor, a third party 155 associated with the sensors, and/or other relevant factors. The server(s) 125 may determine such responses based on information stored, for instance, the sensor database 135, the establishment database 140, the user database 145, and/or the manufacturer database 150. The server(s) 125 may then send one or more responses to the user device (e.g., a coupon, sale offer, product information, etc.). The user device 105 may receive the response(s) from the server(s) and provide them to a user. Alternatively, the user device may execute various actions based on the received response(s). For instance, such actions may include making a phone call, sending a text message, playing a sound, displaying an image, determining a current position via the global positioning system (GPS) or other appropriate ways (e.g., by determining a location of a cell tower used by the user device, the location of a Femtocell, Microcell or other communications system associated with the user device, etc.), etc.

Each client device 160 may allow a third party 155 to send data and/or instructions to the server(s) 125 via the network 120. Such data and/or instructions may include sensor data, establishment data, manufacturer data, and/or other data. The server(s) 125 may process the received data and/or instructions and provide various responses (e.g. an update confirmation message, an action required message, etc.) to the third party 155 through the client device 160.

One of ordinary skill in the art will recognize that the system 100 is conceptual in nature and may be implemented in various different ways without departing from the spirit of the invention. For instance, various elements may be removed and/or various other elements may be included. In addition, multiple elements may be combined into a single element and/or a single element may be divided into multiple elements. Furthermore, various other communication pathways may be utilized and/or included.

Figure 2:
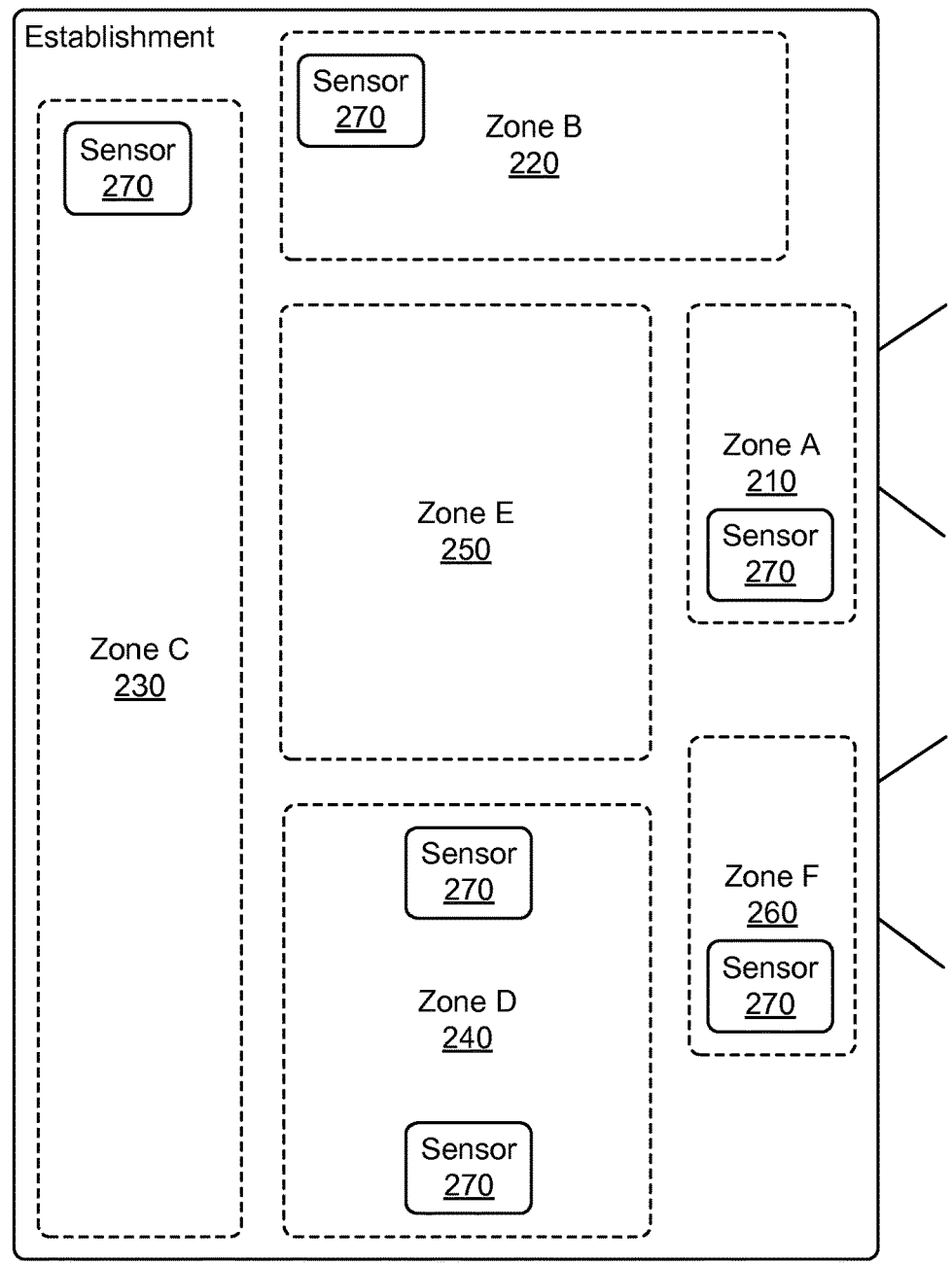
FIG. 2 illustrates a floor plan of an establishment included in some embodiments of the system of FIG. 1.

FIG. 2 illustrates a floor plan of an establishment 200 included in some embodiments of the system 100. Specifically, this figure shows how an establishment may be divided into multiple sections (or "zones") that may each use one or more sensors to identify proximity events. As shown, the establishment 200 may include multiple zones 210-260, each of which may include one or more sensors 270. The sensor location(s) may be configured in various different ways, as appropriate.

In the example of FIG. 2, a first zone 210 may be defined at an entrance of the establishment such that consumers entering the establishment 200 may trigger a proximity event. In this example, a number of product zones 220-240 may be defined such that a consumer may trigger a proximity event when a user device is able to detect the beacon signal of a sensor 270 located relative to the zone. Product zone 240 may include multiple sensors 270 such that the zone is defined as multiple sub-zones, and/or so that an array of proximity events may be determined (e.g., a user application may determine that the user is within a certain proximity of a first sensor, a second sensor, or both a first and second sensor). Zone 250 may define an "inactive" area where no proximity events are generated (e.g., an area of the establishment 200 used only by employees). Finally, zone 260 may be defined at an exit of the establishment such that consumers leaving the establishment 260 may trigger a proximity event.

During operation, a particular consumer-user may have a mobile application running on a user device. The consumer-user may then enter establishment 200 through the entrance 210, generating a proximity event. The event may cause the mobile application to send a notification of the event to a remote server, which in turn may cause the mobile application to perform an action. Such an action may include, for instance, retrieving and displaying a shopping list for the establishment, offering a generic (or user-specific) coupon, provide information regarding sale items, and/or other appropriate actions.

The consumer may then enter a first product zone 220, triggering another proximity event. In this example, the zone 220 may be a deli and the user's shopping list may indicate that the user wishes to buy a half pound of sliced ham. Thus, the proximity event may be used to provide an offer related to ham, display ham that is on sale, display other specials in the deli section, and/or other appropriate actions. The consumer-user may proceed through the establishment in a similar fashion, potentially triggering proximity events related to other zones within the establishment.

After the consumer-user has finished shopping and paid for any items, the user may leave the establishment through the exit 260, triggering a proximity event. In response to such an event, various appropriate actions may be performed, such as displaying a message on the user's mobile device (e.g., "Thank you for shopping with us!").

Proximity events may, in addition to, or in place of, interacting with a consumer or other user, cause data to be generated and stored in a way that is transparent to the user. Such data may be sent to the server and stored remotely. Alternatively, data associated with the user may be stored locally on the user's mobile device. For instance, stored data relating to proximity events may be used to calculate the average time a user spends in an establishment or zone.

One of ordinary skill in the art will recognize that the establishment 200 and associated floor plan and sensor configuration are presented for example purposes only. Different embodiments may include differently configured establishments with differently configured floor plans. In addition, the configuration (and/or number) of sensors located within each establishment may be altered as appropriate.

Figure 3:
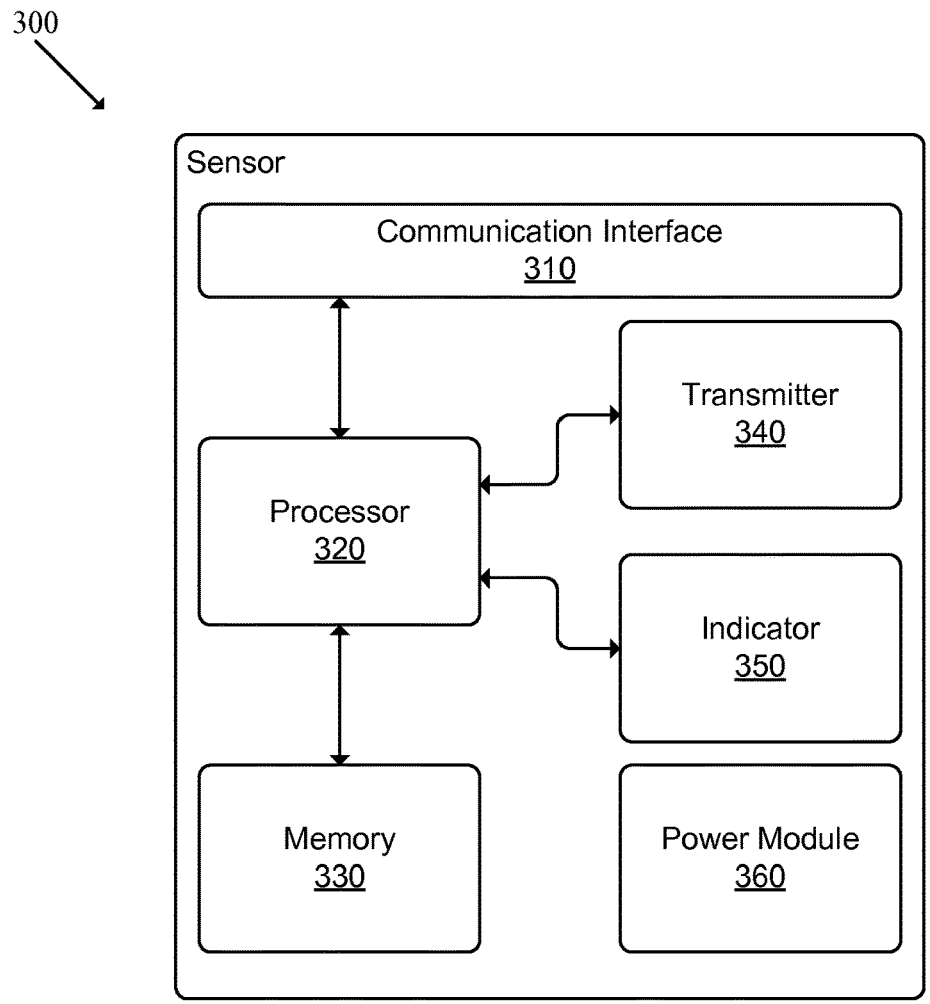
FIG. 3 illustrates a schematic block diagram of a sensor used by some embodiments of the system of FIG. 1.

FIG. 3 illustrates a schematic block diagram of a sensor 300 used by some embodiments of the system 100. Specifically, this figure shows the various components that may be included in the sensor 300 of some embodiments. As shown, the sensor device 300 may include a communication interface 310, a processor 320, a memory 330, a transmitter 340, one or more indicators 350, and/or a power module 360.

The communication interface 310 may be adapted to allow a client device (e.g., a PC, a smart phone, etc.) to communicate with the sensor 300. The communication interface 310 may include various wired and/or wireless connections (e.g., a universal serial bus (USB) port, a Bluetooth or other wireless port, etc.). The communication interface may be adapted to allow users to adjust settings of the sensor (e.g., beacon signal range, direction, interval time, etc.).

In some embodiments, the sensor 300 may be configured when manufactured. In some of these embodiments, the sensor may be configured to run firmware. Such firmware may allow the sensor to continuously operate when power is provided. The firmware may be adapted to cause the sensor continuously or periodically perform various operations (e.g., transmit a beacon signal, react to events, etc.). The sensor attributes may then be configured at the server (e.g., range and spread of the beacon signal, pattern of the signal, definition of events and responses, etc.). Alternatively, various configuration parameters may be defined and/or updated as the sensor operates.

The processor 320 may be adapted to process instructions and/or data. In addition, the processor may be adapted to allow communication among the various other modules of the sensor 300.

The memory 330 may be adapted to store various instructions and/or data used by the sensor 300. Such instruction may include firmware instructions, logical operations, and/or other appropriate instructions. The data may include, for instance, an identifier of the sensor, attributes of the sensor performance (e.g., range and spread of the beacon signal, interval between signals, etc.), and/or other information.

The transmitter 340 may be adapted to transmit various types of beacon signals (e.g., WiFi, Bluetooth (classic, low energy (LE) (e.g., "Bluetooth Smart Ready", "Bluetooth Smart", etc.), Bluetooth v4.0, etc.), etc.) using various different communications protocols (e.g., cellular (e.g., 2G, 3G, 4G LTE, etc.), ZigBee protocol, ANT, ANT+, etc.). The transmitter may be configurable, such that the range and spread of the transmitted signal(s) may be controlled (e.g., by loading values to the sensor memory 330, by defining various attributes at the server, etc.).

In some embodiments, the range, spread, and/or other attributes of the beacon signal may be adjusted at run-time by a client application (e.g., by adjusting a threshold received power used to trigger an event). Such "dynamic range" may be used to allow various sellers (e.g., manufacturers of particular brands) to bid for placement in real-time. For instance, multiple brands of a particular product may be perceived as each being the same distance (or matched to within a particular threshold) from a consumer. In some cases, an order of the items presented may correspond at least partly to various bid amounts associated with sellers of the products (rather than being determined solely based on proximity).

The indicator(s) 350 may be adapted to provide a visual indication of the status of the sensor. The indicator(s) may include various display elements (e.g., differently-colored lights, a set of LEDs, etc.). The indicator(s) may allow a user to determine a current state of the sensor (e.g., "off", "on", "transmitting", "error", etc.). In some embodiments, the indicator(s) may provide other than visual indications (e.g., one or more sound indicators, message(s) delivered to a client device, etc.).

One of ordinary skill in the art will recognize that the sensor 300 is conceptual in nature and may be implemented in various different ways without departing from the spirit of the invention. For instance, various elements may be removed and/or various other elements may be included. In addition, multiple elements may be combined into a single element and/or a single element may be divided into multiple elements. Furthermore, various other communication pathways may be utilized and/or included.

Figure 4:
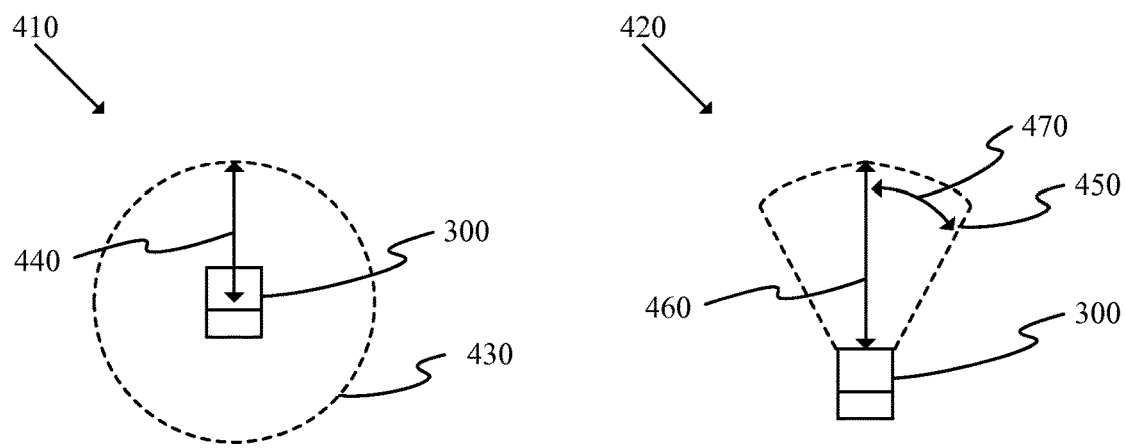
FIG. 4 illustrates top views of the sensor of FIG. 3, showing proximity zones defined by various beacon signals that may be provided by some embodiments of the sensor.

FIG. 4 illustrates top views 410-420 of the sensor 300, showing proximity zones defined by various beacon signals that may be provided by some embodiments of the sensor 300. Specifically, this figure illustrates several example areas that may be defined by setting various beacon signal attributes (e.g., range, direction, and/or spread). As shown, in a first configuration 410, the signal area 430 is omni-directional and the signal range is defined by radius 440. In a second configuration 420, the signal area 450 is defined by a range 460 and spread angle 470.

In some embodiments, the primary direction of the signal (i.e., the signal direction with a minimum spread angle) in the second configuration 420 may be selectable (e.g., the primary direction may be a defined value, such as an angle, relative to various physical attributes of the sensor 300). In some other embodiments, the primary direction of the signal in the second configuration may be pre-set in relation to physical attributes of the sensor (e.g., the sensor may be adapted to mount to a wall and the primary direction of the signal may be set to emanate in a direction perpendicular to and away from the wall).

The shape, direction, range, and/or other attributes of the beacon signal may be defined in various different ways to achieve various different optimizations. For instance, in some embodiments a user of the sensor 300 may wish to generate a signal area that covers the most possible physical space. Such a user may select an omni-directional signal with a maximum range allowed by the sensor. As another example, a user of the sensor may wish to minimize power used by the sensor and thus may define a signal area with limited range and spread.

One of ordinary skill in the art will recognize that the signal areas 430 and 450 are conceptual in nature and may be implemented in various different ways without departing from the spirit of the invention. For instance, the areas may be defined by various different shapes with various specific attributes.

Figure 5:
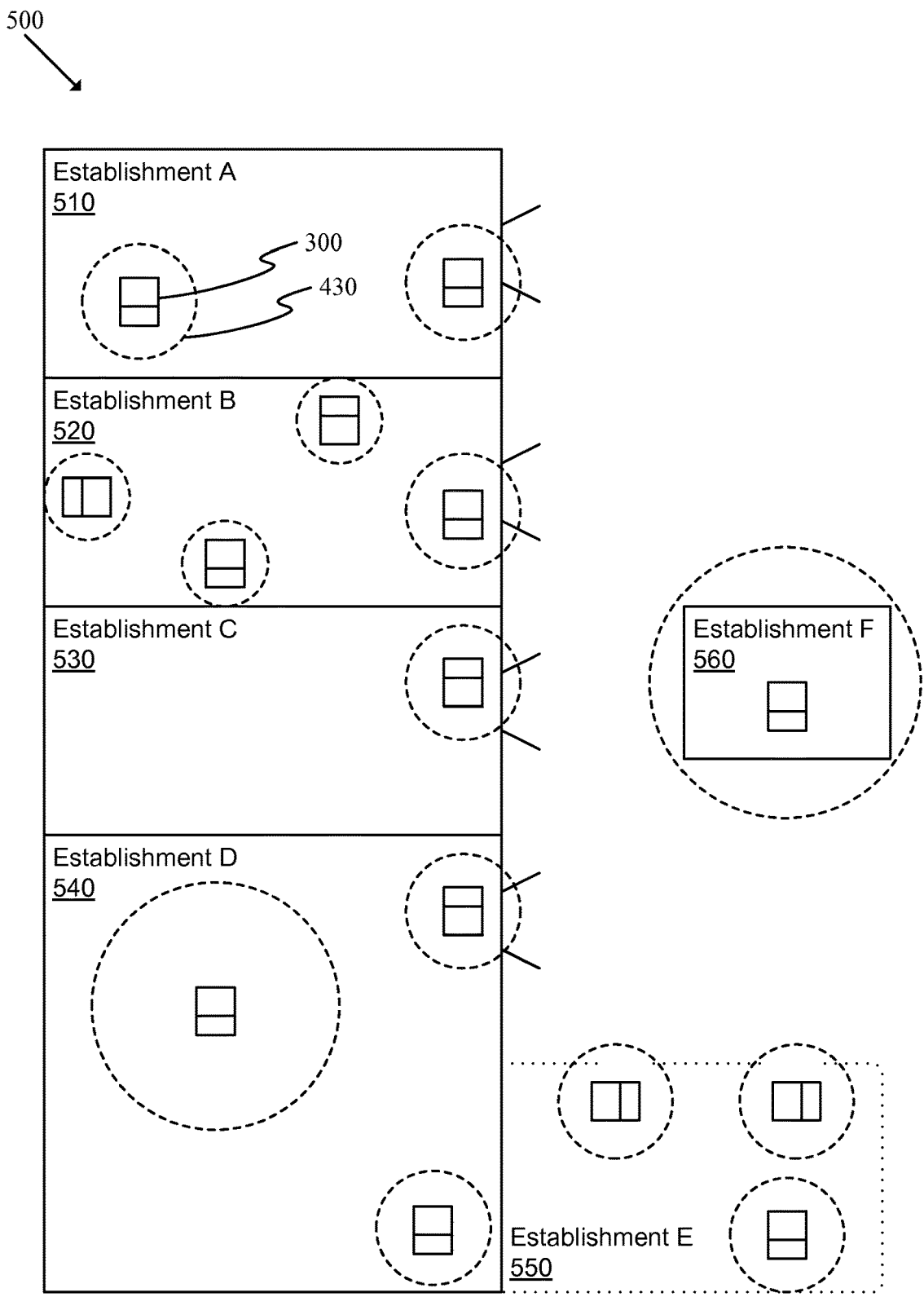
FIG. 5 illustrates a floor plan of a multi-sensor, multi-establishment implementation according to some embodiments of the system of FIG. 1.

FIG. 5 illustrates a floor plan of a multi-sensor, multi-establishment implementation 500 according to some embodiments of the system 100. Specifically, this figure illustrates multiple sensors 300, each configured to provide an omni-directional beacon signal area 420, positioned at example locations throughout the implementation 500.

As shown, the multi-sensor implementation 500 may include one or more establishments 510-560, each establishment including one or more sensors 300. One of ordinary skill in the art would recognize that one or more establishments may not include any sensors (not shown in this example). In addition, one of ordinary skill in the art would recognize that various ranges, directions, and spread of signals may be used, as described above in reference to FIG. 4.

In the example of FIG. 5, a first establishment 510 may include a sensor 300 located near an entrance and another sensor 300 located within the establishment 510. A second establishment 520 may include multiple sensors 300 placed at various locations throughout the establishment 520. A third establishment 530 may have only one sensor 300 located in the establishment 530. A fourth location 540 may include multiple sensors 300, where one sensor is configured to have a much greater beacon signal range 420 than the other sensors 300. A fifth establishment 550 may include multiple entryways/exitways, each associated with a sensor 300, and another sensor located within the establishment 550. In this example, the fifth establishment 550 may be an open area (e.g., a section of a parking area, field, etc.) and/or be at least partly defined by a temporary structure (e.g., a cover, tent, set of display tables, etc.). A sixth establishment 560 may be an outdoor booth or cart with a single sensor 300 that defines an area that includes locations outside the boundaries of the booth or cart.

One of ordinary skill in the art will recognize that schematic diagram of a multi-sensor configuration 500 is conceptual in nature and may be implemented in various different ways without departing from the spirit of the invention. For instance, different establishments or groups of establishments may have different shapes, floor plans, etc.

II. Software Architecture

Figure 6:
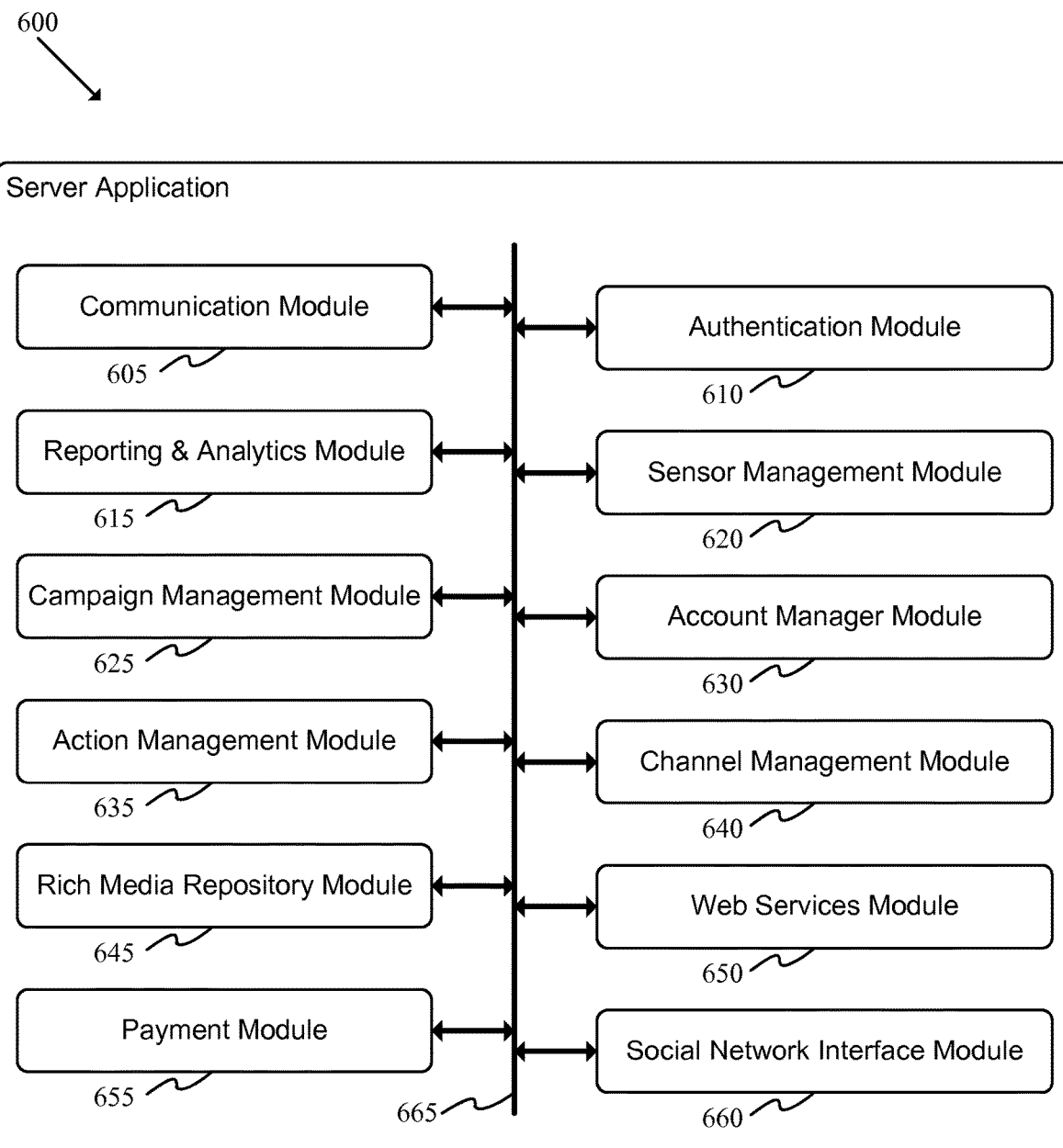
FIG. 6 illustrates a schematic block diagram of a conceptual server application provided by some embodiments of the invention.

FIG. 6 illustrates a schematic block diagram of a conceptual server application 600 provided by some embodiments of the invention. Specifically, this figure shows various system components that may be provided by the server (or server-side) application. Such a server-side application may be executed by one or more appropriate user devices. As shown, the server application may include a communication module 605, an authentication module 610, a reporting & analytics module 615, a sensor management module 620, a campaign management module 625, an account manager module 630, an action management module 635, a channel management module 640, a rich media repository module 645, a web services module 650, a payment module 655, a social network interface module 660, and/or a communications bus 665.

The communication module 605 may be adapted to communicate with various client devices, typically across one or more networks. The authentication module 610 may be adapted to confirm and/or validate user account information (e.g., a login name and password) supplied by a user (e.g., a consumer, an establishment-user, a manufacturer-user, etc.). The reporting and analytics module 615 may be adapted to perform various analyses and reporting of collected data. Such a module may be used to generate reports, produce charts and/or export data that can be analyzed by and/or integrated into third-party systems. The sensor management module 620 may be adapted to control and manage the sensors used by some embodiments (e.g., by defining events, ranges, etc.).

The campaign management module 625 may be adapted to allow management of marketing campaigns. The account manager module 630 may be adapted to allow management of various accounts (e.g., consumer-user, establishment-user, manufacturer-user, etc.). The action management module 635 may be adapted to create, configure and associate events with corresponding sensors. The channel management module 640 may be adapted to customize advertisements, marketing messages and application events based on a device's capabilities and methods of connection. The rich media repository module 645 may be adapted to provide and store rich media resources. The web services module 650 may be adapted to configure the user/client information and settings via various webpages.

The payment module 655 may be able to process invoice, billing, and/or payment information in various appropriate ways. The social network interface module may be able to interact with various third-party social networks. Such networks may be accessed through various combinations of networks (e.g., the Internet), interfaces (e.g., one or more APIs), and/or other elements. Such a social network interface may, for instance, allow a user to recommend (and/or receive recommendations regarding) an establishment, item, service, etc. to various other users that may be associated with a social network account of the user.

The bus 665 may be able to allow communication among the various other elements 605-660 of the server application 600.

The operation of the server application 600 will be described in more detail in reference to Section III below.

One of ordinary skill in the art will recognize that the server application 600 is conceptual in nature and may be implemented in various different ways without departing from the spirit of the invention. For instance, various elements may be removed and/or various other elements may be included. In addition, multiple elements may be combined into a single element and/or a single element may be divided into multiple elements. Furthermore, various other communication pathways may be utilized and/or included.

Figure 7:
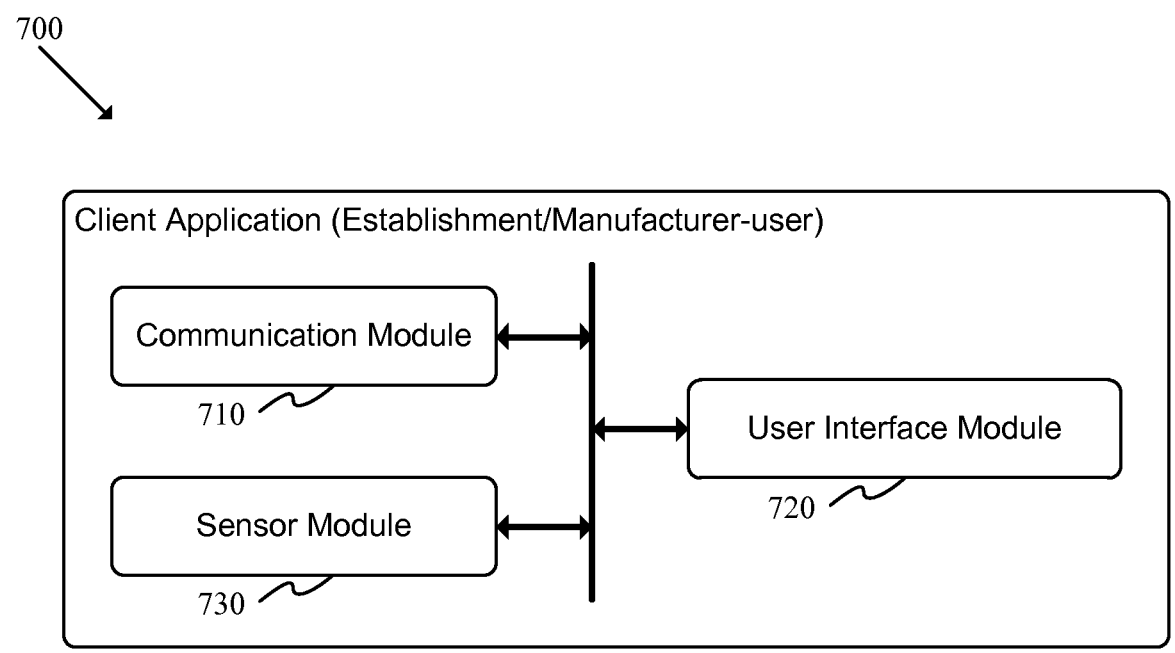
FIG. 7 illustrates a schematic block diagram of a conceptual user application provided by some embodiments of the invention.

FIG. 7 illustrates a schematic block diagram of a conceptual user application 700 provided by some embodiments of the invention. Specifically, this figure shows various system components that may be provided by the client (or client-side) application. Such a client-side application may be executed by an appropriate user device. As shown, the application may include a communication module 710, a user interface module 720, and/or a sensor module 730.

The communication module 710 may be adapted to communicate with various server devices, typically across one or more networks. In addition, the communication module may be adapted to communicate with one or more sensors of some embodiments. The user interface module 720 may be adapted to provide outputs to a user and/or receive inputs from the user. The sensor module 730 may be adapted to configure, test, communicate with, and/or otherwise interact with one or more sensors of some embodiments.

One of ordinary skill in the art will recognize that the establishment-user and/or manufacturer-user application 700 is conceptual in nature and may be implemented in various different ways without departing from the spirit of the invention. For instance, various elements may be removed and/or various other elements may be included. In addition, multiple elements may be combined into a single element and/or a single element may be divided into multiple elements. Furthermore, various other communication pathways may be utilized and/or included.

Figure 8:
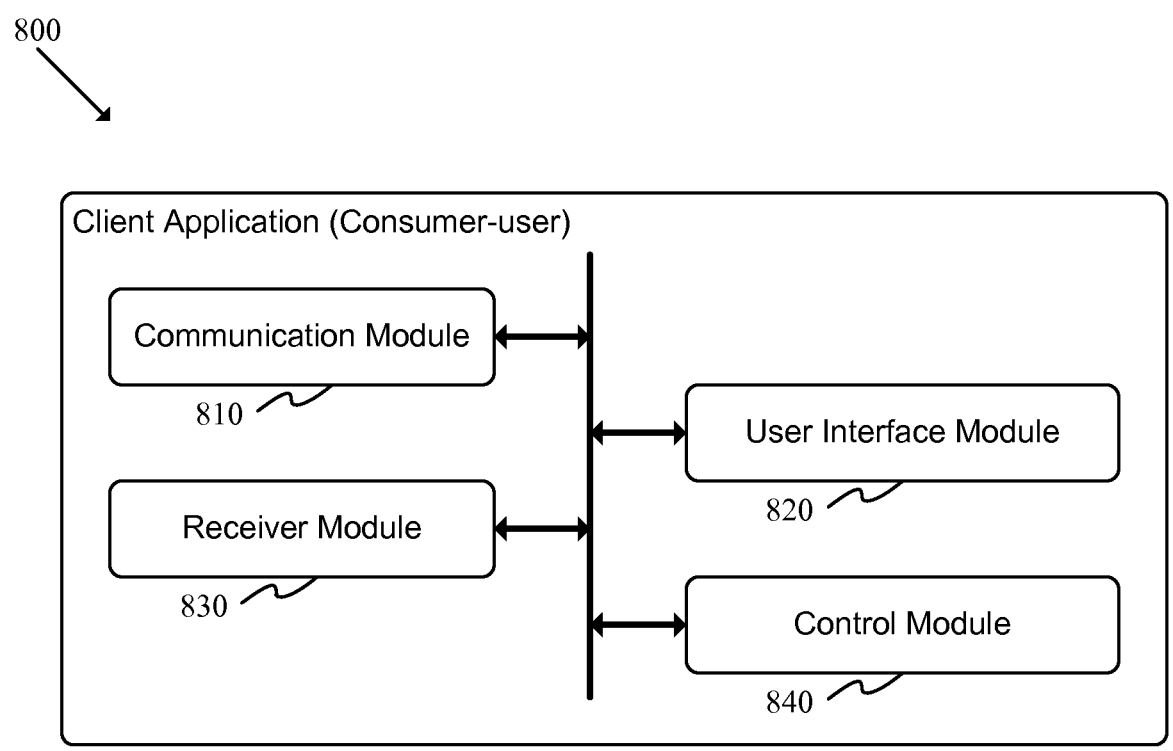
FIG. 8 illustrates a schematic block diagram of an alternative conceptual user application provided by some embodiments of the invention.

FIG. 8 illustrates a schematic block diagram of an alternative conceptual user application 800 provided by some embodiments of the invention. Specifically, this figure shows various system components that may be provided by the client (or client-side) application. Such an application may be executed by an appropriate user device (e.g., a smart phone, a tablet, etc.) and may use various resources provided by the user device (e.g., network connections, storages, GPS, etc.). As shown, the application may include a communication module 810, a user interface module 820, a receiver module 830, and/or a control module 840.

The communication module 810 may be adapted to communicate with various server devices, typically across one or more networks. The user interface module 820 may be adapted to provide outputs to a user and/or receive inputs from the user. The receiver module 830 may be adapted to receive beacon signals from the sensors of some embodiments. The control module 840 may be adapted to control various aspects of a user device (e.g., by causing the device to display a GUI, to send a text message, to place a phone call, to play a sound, etc.).

One of ordinary skill in the art will recognize that the consumer-user application 800 is conceptual in nature and may be implemented in various different ways without departing from the spirit of the invention. For instance, various elements may be removed and/or various other elements may be included. In addition, multiple elements may be combined into a single element and/or a single element may be divided into multiple elements. Furthermore, various other communication pathways may be utilized and/or included.

Figure 9:
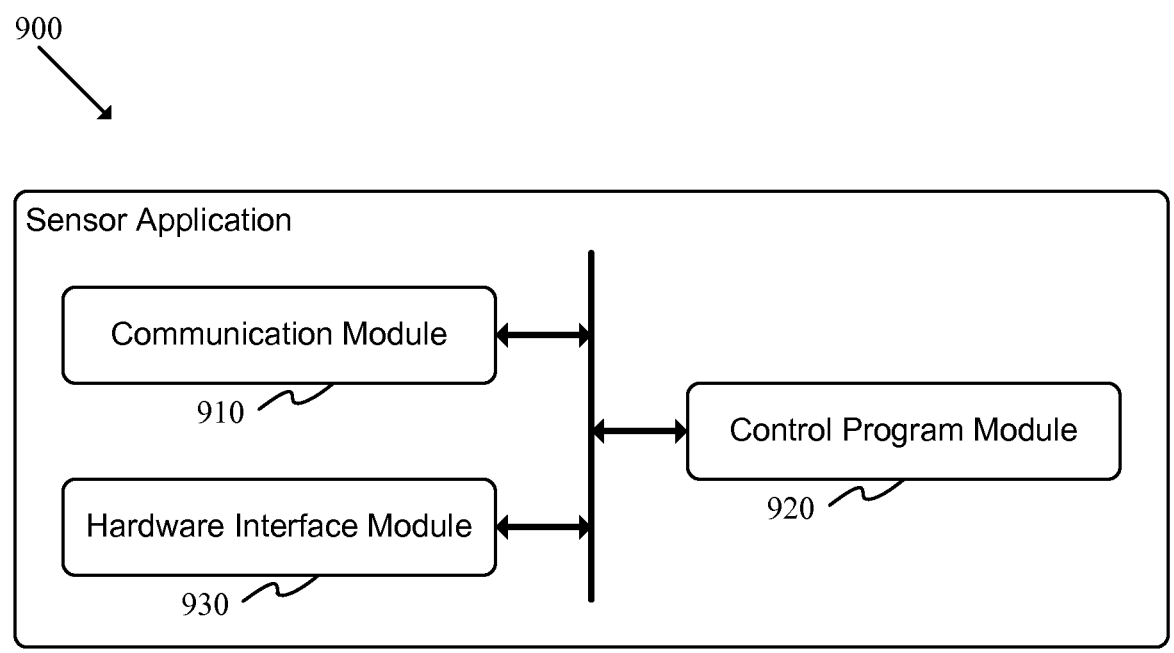
FIG. 9 illustrates a schematic block diagram of a sensor application provided by some embodiments.

FIG. 9 illustrates a schematic block diagram of a sensor application 900 provided by some embodiments of the invention. Specifically, this figure shows various system components that may be provided by the sensor application. The combination of sensor software and memory described above in reference to FIG. 3 may provide a firmware solution for controlling the operation of a sensor. Such an application 900 may be executed by an appropriate sensor device (e.g., sensor 300) and may use various resources provided by the sensor device (e.g., a transmitter, memory, etc.). As shown, the application may include a communication module 910, a control program module 920, and/or a hardware interface module 930.

The communication module 910 may be adapted to communicate with various other devices (e.g., user devices, server devices, etc.). The control program module 920 may be adapted to implement various pre-programmed operations of the sensor. The hardware interface module 930 may be adapted to control and/or communicate with various elements of the sensor device (e.g., a transmitter, indicators, etc.).

One of ordinary skill in the art will recognize that the sensor application 900 is conceptual in nature and may be implemented in various different ways without departing from the spirit of the invention. For instance, various elements may be removed and/or various other elements may be included. In addition, multiple elements may be combined into a single element and/or a single element may be divided into multiple elements. Furthermore, various other communication pathways may be utilized and/or included.

Figure 10:
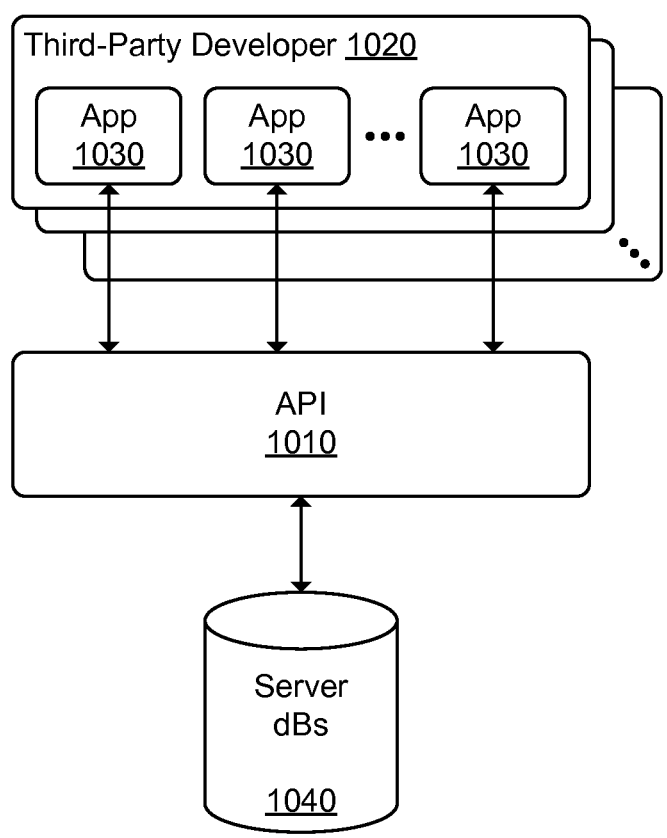
FIG. 10 illustrates a schematic block diagram of a system including an application interface provided by some embodiments of the invention.

FIG. 10 illustrates a schematic block diagram of a system 1000 including an application interface 1010 provided by some embodiments of the invention. Specifically, this figures shows various system components that may be provided to third-party application developers in some embodiments. As shown, the system may include the interface 1010, one or more third-party developers 1020, one or more applications 1030, and one or more server databases 1040.

The interface 1010 may allow third-party application developers 1020 to develop various third-party applications 1030 that may be able to access the server databases 1040 through the interface 1010.

The interface 1010 may include, for example, a representational state transfer ("REST") interface (and/or other appropriate interfaces) that may allow third-party developers to utilize http commands to access the server databases 1020.

One of ordinary skill in the art will recognize that the system 1000 is conceptual in nature and may be implemented in various different ways without departing from the spirit of the invention. For instance, various elements may be removed and/or various other elements may be included. In addition, multiple elements may be combined into a single element and/or a single element may be divided into multiple elements. Furthermore, various other communication pathways may be utilized and/or included.

Figure 11:
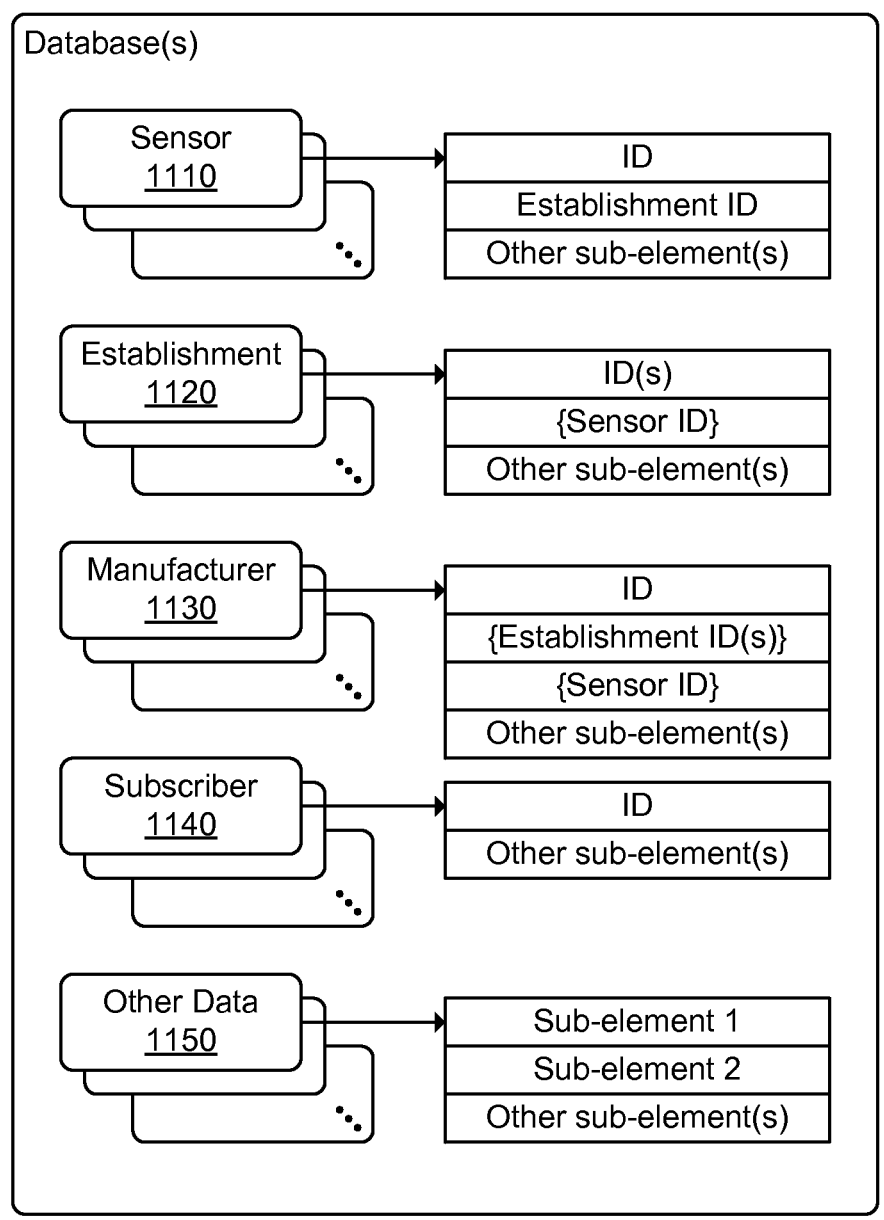
FIG. 11 illustrates a block diagram of a database including various conceptual data structures used by some embodiments of the invention.

FIG. 11 illustrates a block diagram of a database 1100 including various conceptual data structures or elements 1110-1140 used by some embodiments of the invention. Specifically, this figure shows various data elements that may be utilized by some embodiments of the invention. As shown, the database 1100 of some embodiments may include one or more sensor data elements 1110, one or more establishment data elements 1120, one or more manufacturer data elements 1130, one or more subscriber data elements 1140, and/or one or more other data elements 1150.

Each sensor data element 1110 may include an ID, an establishment ID, and/or other sub-elements (e.g., events associated with the sensor). Each establishment data element 1120 may include one or more IDs (each ID may correspond to a particular location of the establishment, such as one establishment among a retail chain or a zone within a single establishment), a set of associated sensor IDs, and/or other sub-elements (e.g., menu tables, order tables, shopping carts, etc.). Each manufacturer data element 1130 may include an ID, a set of establishment IDs (each associated establishment may correspond to a particular establishment and/or location), a set of sensor IDs, and/or other sub-elements (e.g., brands associated with the manufacturer, special offers associated with the manufacturer, etc.). Each subscriber (or consumer) data element 1140 may include an ID and/or other sub-elements (e.g., a username, password, and/or other sub-elements such as attributes and/or history related to the subscriber). Each other data element 1150 may include one or more sub-elements, where each sub-element may include some data item related to the data element.

One of ordinary skill in the art will recognize that the data structures of FIG. 11 are conceptual in nature and may be implemented in various different ways without departing from the spirit of the invention. For instance, although the database is represented as a single entity, it may in fact be implemented using multiple physical systems distributed among various locations. As another example, various groups of data elements may be combined to form tables of data. As yet another example, various sub-elements may be associated with multiple data elements, as appropriate.

Figure 12:
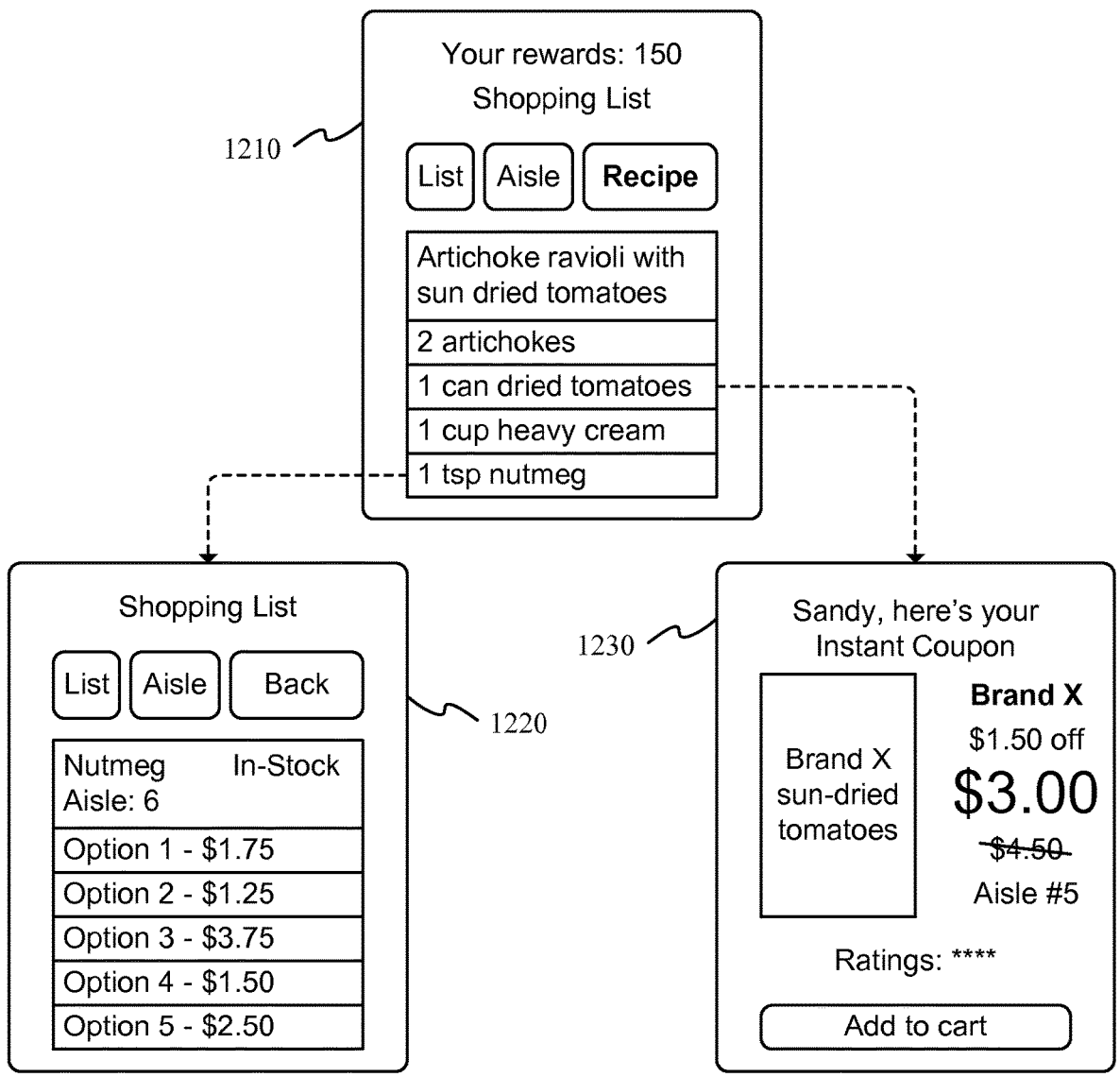
FIG. 12 illustrates several example graphical user interfaces (GUIs) provided by some embodiments.

FIG. 12 illustrates several example GUIs 1210-1230 provided by some embodiments. Specifically, this figure shows various example screens that may be displayed to a consumer during a shopping excursion. As shown, the first GUI 1210 includes a main navigation screen with various selectable buttons, selectable list items, account indicators, etc.

The second GUI 1220 includes a product list sorted by brand which may include inventory and location within an establishment. The second GUI may be activated, for instance, when a user selects a list item (e.g., by pressing a touchscreen, by positioning a cursor, etc.). The third GUI 1230 may be activated, for instance, when a user selects a list item with an associated marketing offer. As shown, the third GUI 1230 may include various multimedia elements and may allow a user to receive some special savings (e.g., a coupon, a user-specific reward, etc.). In addition, this example shows that some elements may be personalized (e.g., the consumer may be referred to by her name, a nickname/username, and/or other appropriate ways).

In addition, such GUIs may include elements such as, for example, a rewards indicator (e.g., a display of points associated with a loyalty reward program), various ratings, recommendations, etc. The GUIs may also allow a user to perform actions (e.g., "add to cart", "add to loyalty card", "add to credit card rewards", etc.). This may allow, for instance, a user to utilize a loyalty rewards program without having to carry a rewards card.

One of ordinary skill in the art will recognize that the GUIs of FIG. 12 are conceptual in nature and may be implemented in various different ways without departing from the spirit of the invention. For instance, although each GUI is represented as having various selection buttons, such selections may be made in various different ways (e.g., using voice commands, using a touch screen, etc.). As another example, various groups of listing elements may be formatted and displayed in various different ways (e.g., using tables, bulleted lists, etc.). As yet another example, various promotional elements may be presented in various appropriate ways (e.g., by providing multimedia content, by providing text-based content, etc.).

III. Methods of Operation

Figure 13:
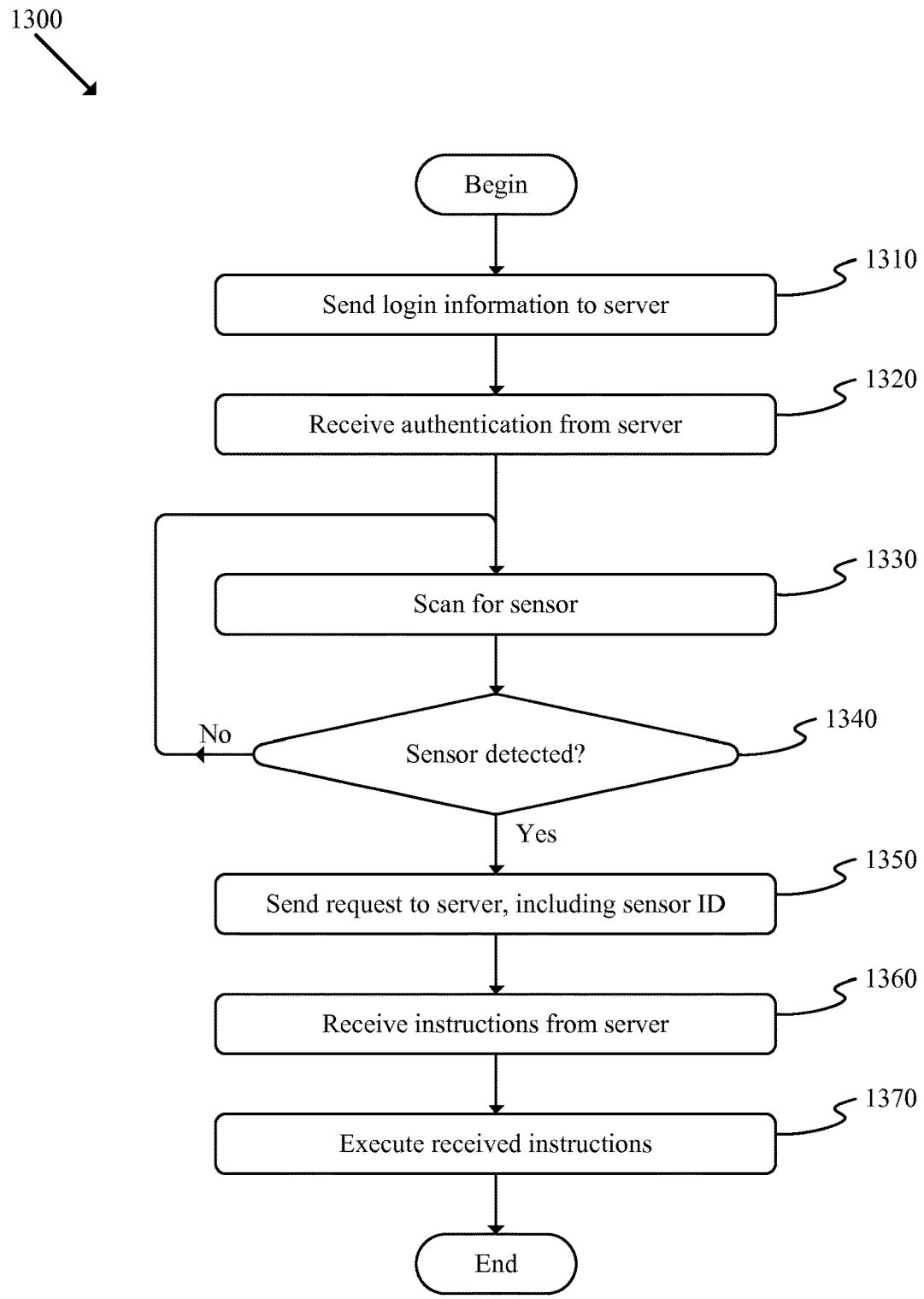
FIG. 13 illustrates a flow chart of a conceptual process used by some embodiments of the invention to allow a consumer to interact with the system of FIG. 1.

FIG. 13 illustrates a flow chart of a conceptual process 1300 used by some embodiments of the invention to allow a consumer to interact with the system 100. Process 1300 may begin, for instance, when a user launches a client application on a mobile device.

Process 1300 may then send (at 1310) login information to a server. Such login information may include a user account name, account password, device identification, etc. The process then may receive (at 1320) authentication from the server. Such authentication may include a message, flag, or other appropriate indication that the user has been authenticated (or not). When the user authentication is not received within a certain time period or when a rejection of the login information is received, the process may end.

Otherwise, when a valid authentication is received, the process may scan (at 1330) for a sensor. The process may then determine (at 1340) whether a sensor is detected. Such a determination may be based on various appropriate factors (e.g., proximity to the sensor, event(s) associated with the sensor, etc.). If a sensor is not detected, the process may repeatedly or continuously scan (at 1330) for a sensor until a sensor is detected or the client application is terminated.

If the process determines (at 1340) that a sensor has been detected, the process may send (at 1350) a request to the server. Such a request may include the sensor ID, user location, etc.

The process may then receive (at 1360) instructions from the server. Such instructions may include various actions to be performed by the user device (e.g., displaying a coupon, playing a sound, displaying a video, etc.) which may be associated with various multimedia data (e.g., coupons, advertisements, news, music, etc.) that may also be received from the server.

Next, process 1300 may execute (at 1370) any received instructions. After executing (at 1370) the received instructions, the process may end.

One of ordinary skill in the art will recognize that process 1300 is conceptual in nature and may be implemented in various different ways without departing from the spirit of the invention. For instance, the operations may be performed in different orders. As another example, various operations may be omitted and/or other operations may be included. Furthermore, the process, or portions thereof, may be executed as part of a larger macro-process, and/or divided into multiple sub-processes. Moreover, the process, or portions thereof, may be executed continuously, at regular intervals, based on certain criteria, and/or in other appropriate ways.

Figure 14:
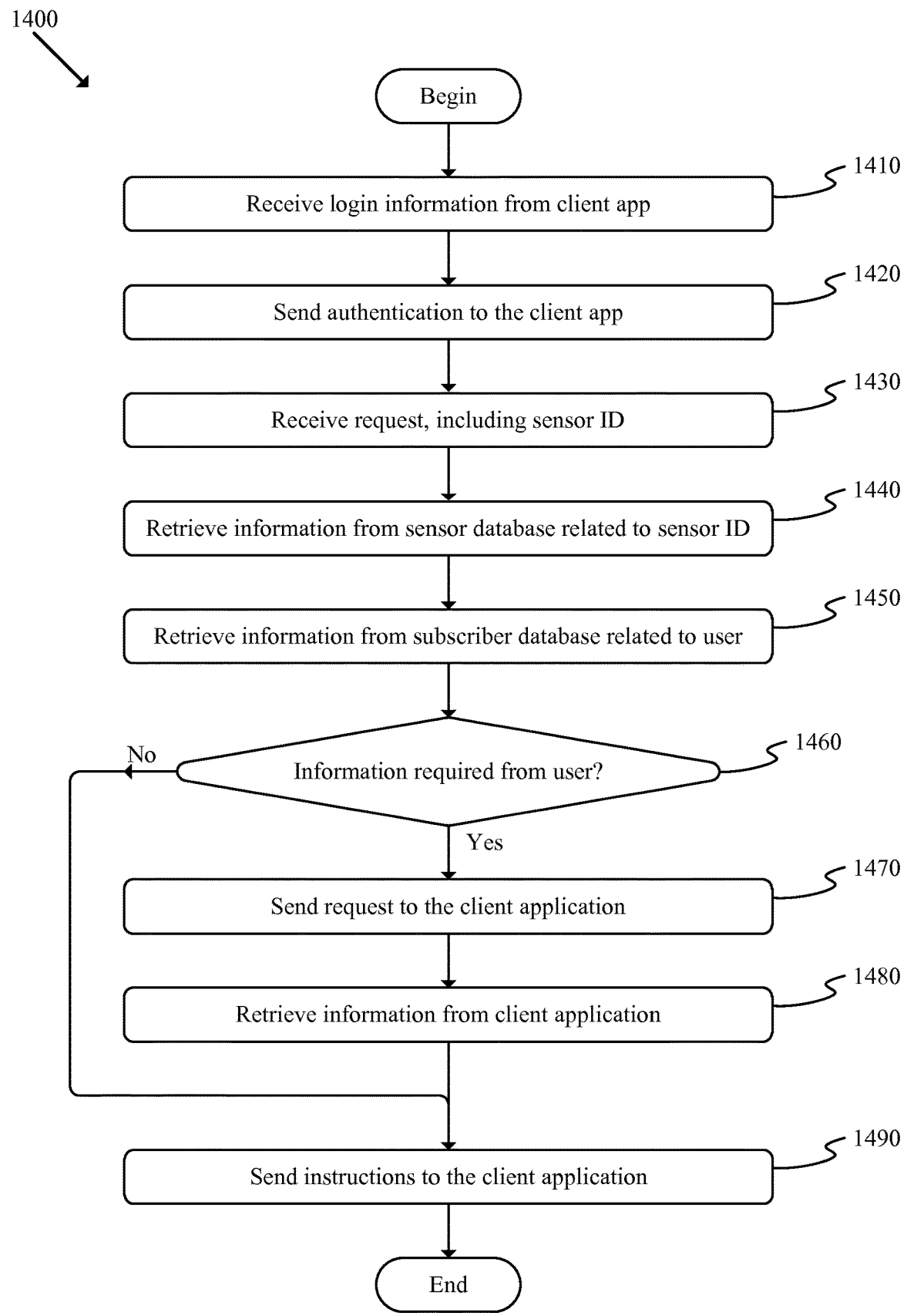
FIG. 14 illustrates a flow chart of a conceptual process used by some embodiments of the invention to communicate among the server(s) and user application(s) during consumer interaction.

FIG. 14 illustrates a flow chart of a conceptual process 1400 used by some embodiments of the invention to communicate among the server(s) and user application(s) during consumer interaction. The process may begin, for instance, when a client application attempts to communicate with a server application of some embodiments.

Next, the process may receive (at 1410) login information from the client application. Such login information may include a username, password, device identification, and/or other appropriate information.

The process may then send (at 1420) an authentication to the client application. Such authentication may include a confirmation signal, message, and/or other appropriate indicator that the login information has been verified.

Next, the process may receive (at 1430) a request. Such a request may include a sensor ID and other appropriate information (e.g., user location).

Process 1400 may then retrieve (at 1440) information from a sensor database related to the sensor ID. Such information may include sensor type, sensor location, etc.

Next, the process may retrieve (at 1450) information from a subscriber database related to one or more users associated with the user account. Such information may include, for example, historic purchase records, user preferences, etc.

The process then may determine (at 1460) whether additional information is required from the user. Such a determination may be based at least partly on the selected sensor and/or user account. For example, certain sensors may require additional information (e.g., user age, sex, etc.) to verify whether an event should be triggered.

If the process determines (at 1460) that additional information is required, the process may send (at 1470) a request to the client application. Such a request may include a listing the required additional information.

The process may then retrieve (at 1480) the requested information from the client application (e.g., by prompting the user to make various entries and/or selections).

After retrieving (at 1480) information from the client application, or if the process determines (at 1460) that information from the user is not required, the process may then send (at 1490) instructions to the client application. Such instructions may include various multimedia data (e.g., coupons, advertisements, news, music, etc). For example, the server may send a link for users, which may include a coupon, advertisement, music, etc. After sending (at 1490) instructions to the client application, the process may end.

One of ordinary skill in the art will recognize that process 1400 is conceptual in nature and may be implemented in various different ways without departing from the spirit of the invention. For instance, the operations may be performed in different orders. As another example, various operations may be omitted and/or other operations may be included. Furthermore, the process, or portions thereof, may be executed as part of a larger macro-process, and/or divided into multiple sub-processes. Moreover, the process, or portions thereof, may be executed continuously, at regular intervals, based on certain criteria, and/or in other appropriate ways.

Figure 15:
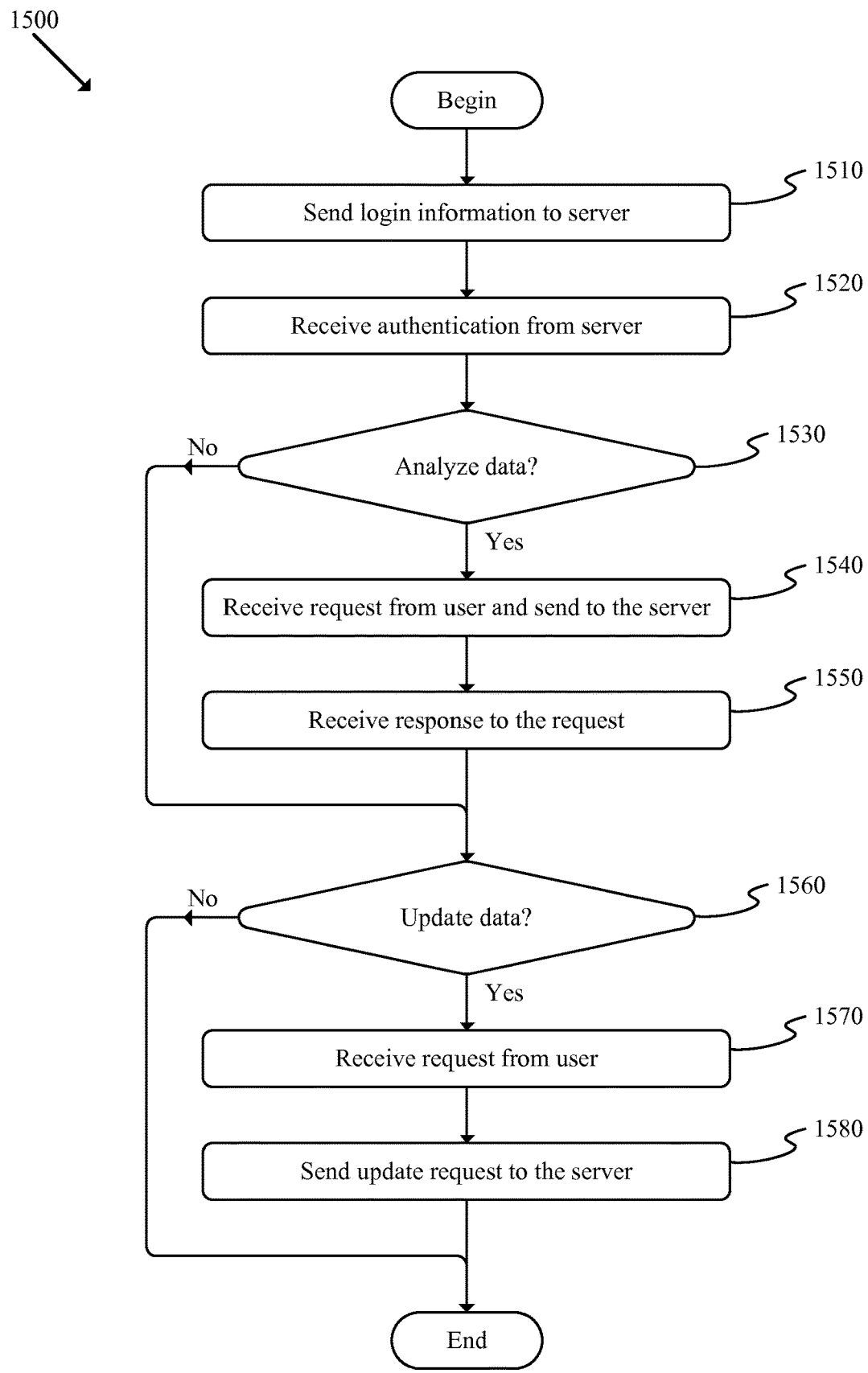
FIG. 15 illustrates a flow chart of a conceptual process used by some embodiments of the invention to allow a user to interact with the system of FIG. 1.

FIG. 15 illustrates a flow chart of a conceptual process 1500 used by some embodiments of the invention to allow a user to interact with the system 100. Process 1500 may begin, for instance, when a user launches a user application on a mobile device.

Process 1500 may then send (at 1510) login information to the server. Such login information may include a username, password, device ID, etc. Next, the process may receive (at 1520) authentication from the server. Alternatively, authentication may not be received and the process may end. The process may then determine (at 1530) whether data analysis is required. Such a determination may be based on data entered by a user (e.g., the user may select a data analysis option, provide a dataset for analysis, and/or otherwise indicate that analysis is required). If the process determines (at 1530) that data analysis is required, the process may receive (at 1540) a request from the user and send it to the server. Such a request may include data such as user type, establishment type, establishment location, etc.

Next, the process may receive (at 1550) a response to the request. Such a response may include different types of data (e.g., a table, list, etc.). After receiving (at 1550) a response to the request, or if the process determines (at 1530) that data analysis is not required, the process may then determine (at 1560) whether to update data. Such a determination may be made based on various relevant factors (e.g., availability of new data, a user update request, etc.).

If the process determines (at 1560) that an update is to be made, the process may receive (at 1570) an update request from the user. Such a request may include various data attributes to be updated (e.g., sensor data, campaign data, etc.). Next, the process may send (at 1580) the update request to the server.

After sending (at 1580) the update request to the server, or if the process determines (at 1560) that no data updates are required, the process may end.

One of ordinary skill in the art will recognize that process 1500 is conceptual in nature and may be implemented in various different ways without departing from the spirit of the invention. For instance, the operations may be performed in different orders. As another example, various operations may be omitted and/or other operations may be included. Furthermore, the process, or portions thereof, may be executed as part of a larger macro-process, and/or divided into multiple sub-processes. Moreover, the process, or portions thereof, may be executed continuously, at regular intervals, based on certain criteria, and/or in other appropriate ways.

Figure 16:
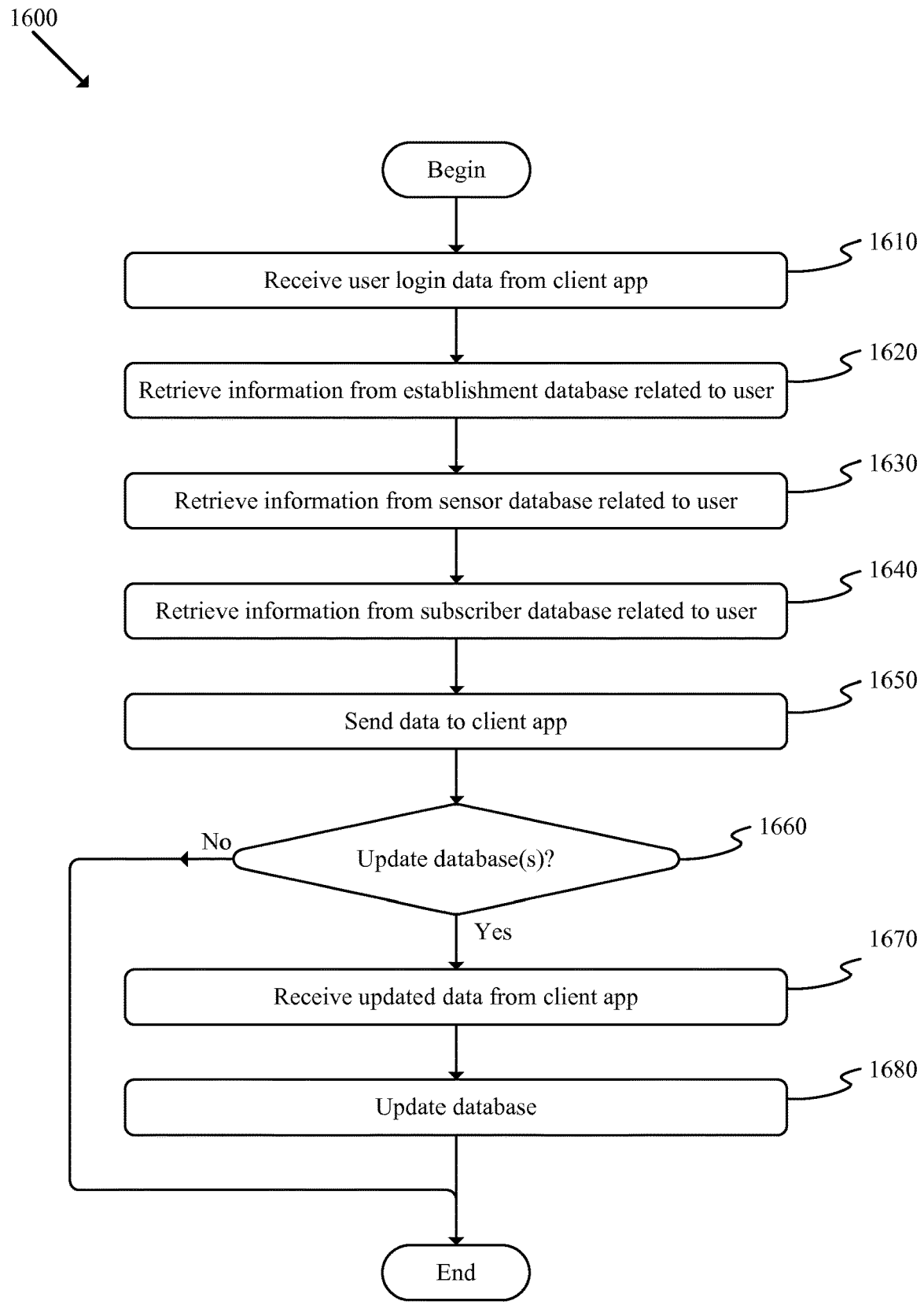
FIG. 16 illustrates a flow chart of a conceptual process used by some embodiments of the invention to communicate among the server(s) and user application(s) during user interaction.

FIG. 16 illustrates a flow chart of a conceptual process 1600 used by some embodiments of the invention to communicate among the server(s) and user application(s) during user interaction. The process may begin, for instance, when an establishment-user or manufacturer-user launches a client application.

Next, the process may receive (at 1610) user login data from a client application. Such login information may include a username, password, device ID, and/or other appropriate information. The process then may retrieve (at 1620) information from an establishment database related to the user.

Next, the process may retrieve (at 1630) information from a sensor database related to the user. Process 1600 may then retrieve (at 1640) information from a subscriber database related to the user.

The process may then send (at 1650) data to a client application. Such data may include establishment, sensor and/or subscriber information.

The process then may determine (at 1660) whether to update database(s) associated with the user. If the process determines (at 1660) that an update to the database(s) is needed, the process may receive (at 1670) updated data from the client application. Such data may include establishment data, sensor data, etc. Next, the process may update (at 1680) the database(s) based on the received data.

After updating (at 1680) the database(s), or if the process determines (at 1660) that updated database(s) are not requested, the process may end.

One of ordinary skill in the art will recognize that process 1600 is conceptual in nature and may be implemented in various different ways without departing from the spirit of the invention. For instance, the operations may be performed in different orders. As another example, various operations may be omitted and/or other operations may be included. Furthermore, the process, or portions thereof, may be executed as part of a larger macro-process, and/or divided into multiple sub-processes. Moreover, the process, or portions thereof, may be executed continuously, at regular intervals, based on certain criteria, and/or in other appropriate ways.

Figure 17:
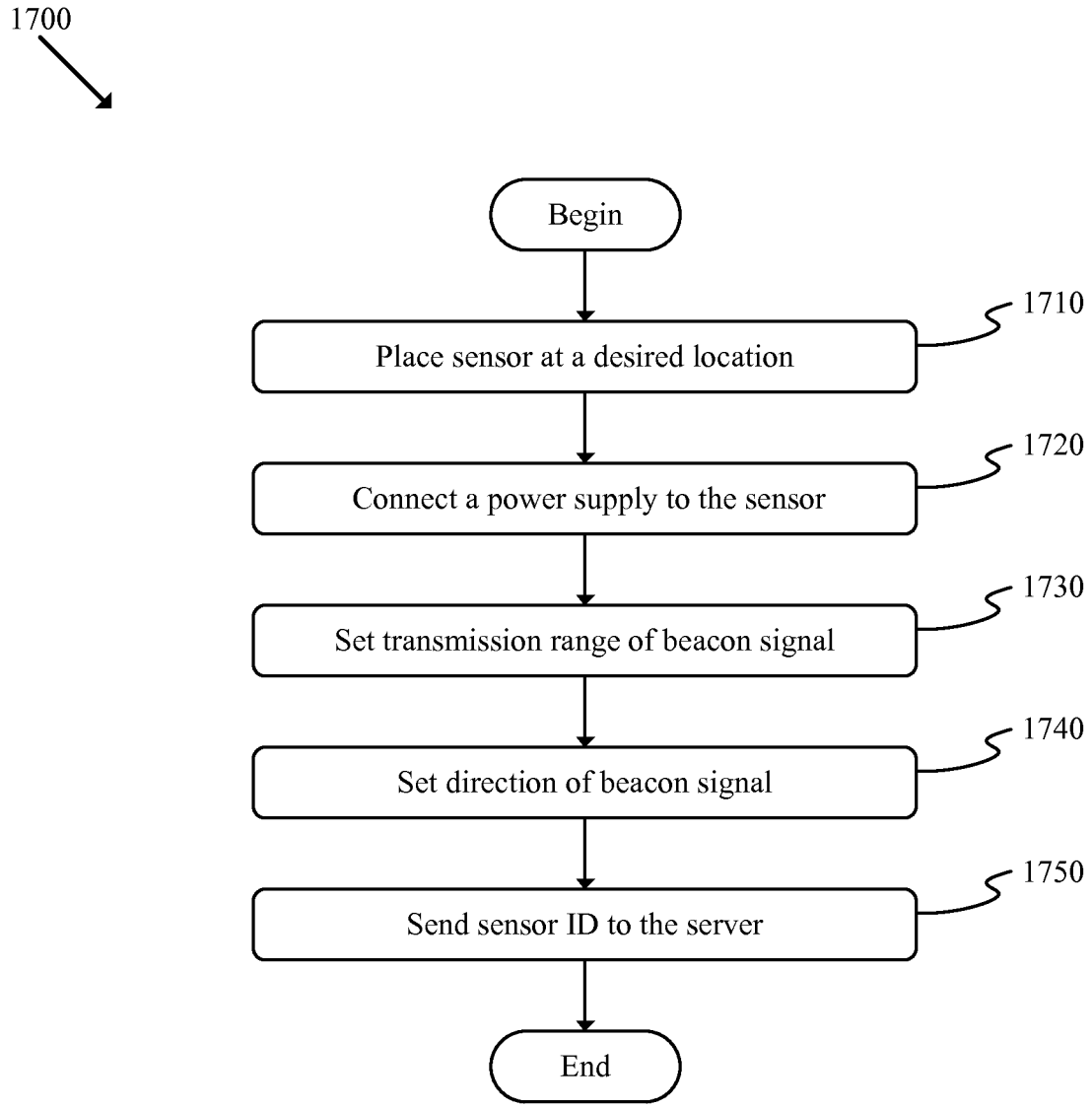
FIG. 17 illustrates a flow chart of a conceptual process used by some embodiments to configure a sensor used by some embodiments of the system of FIG. 1.

FIG. 17 illustrates a flow chart of a conceptual process 1700 used by some embodiments to configure a sensor used by some embodiments of the system 100. Such a process may begin, for instance, when an establishment and/or manufacturer decides to install a sensor.

Process 1700 may then place (at 1710) the sensor at a desired location. For example, the establishment-user and/or manufacturer-user may place the sensor at an appropriate location within an establishment.

Next, the process may connect (at 1720) a power supply to the sensor. Such a power supply may be connected by inserting a set of batteries into the sensor, connecting an AC power supply to the sensor, and/or other appropriate ways.

The process may then set (1730) a transmission range of a beacon signal associated with the sensor. The transmission range of the beacon signal may be configured in various appropriate ways (e.g., by manipulating server data associated with the sensor, by programming the internal memory of the sensor, etc.).

After setting (1730) the transmission range, the process then may set (1740) a direction of the beacon signal. The direction may be set relative to a defined location of the sensor. The angle and/or spread (or span) of the beacon signal may also be programmed.

Next, the process may send (at 1740) the sensor ID to the server. In some embodiments, the sensor ID may already be known to the server, and the sensor may be associated with a particular location, establishment, etc. After sending (at 1740) the sensor ID to the server, the process may end.

One of ordinary skill in the art will recognize that process 1700 is conceptual in nature and may be implemented in various different ways without departing from the spirit of the invention. For instance, the operations may be performed in different orders. As another example, various operations may be omitted and/or other operations may be included. Furthermore, the process, or portions thereof, may be executed as part of a larger macro-process, and/or divided into multiple sub-processes. Moreover, the process, or portions thereof, may be executed continuously, at regular intervals, based on certain criteria, and/or in other appropriate ways.

Figure 18:
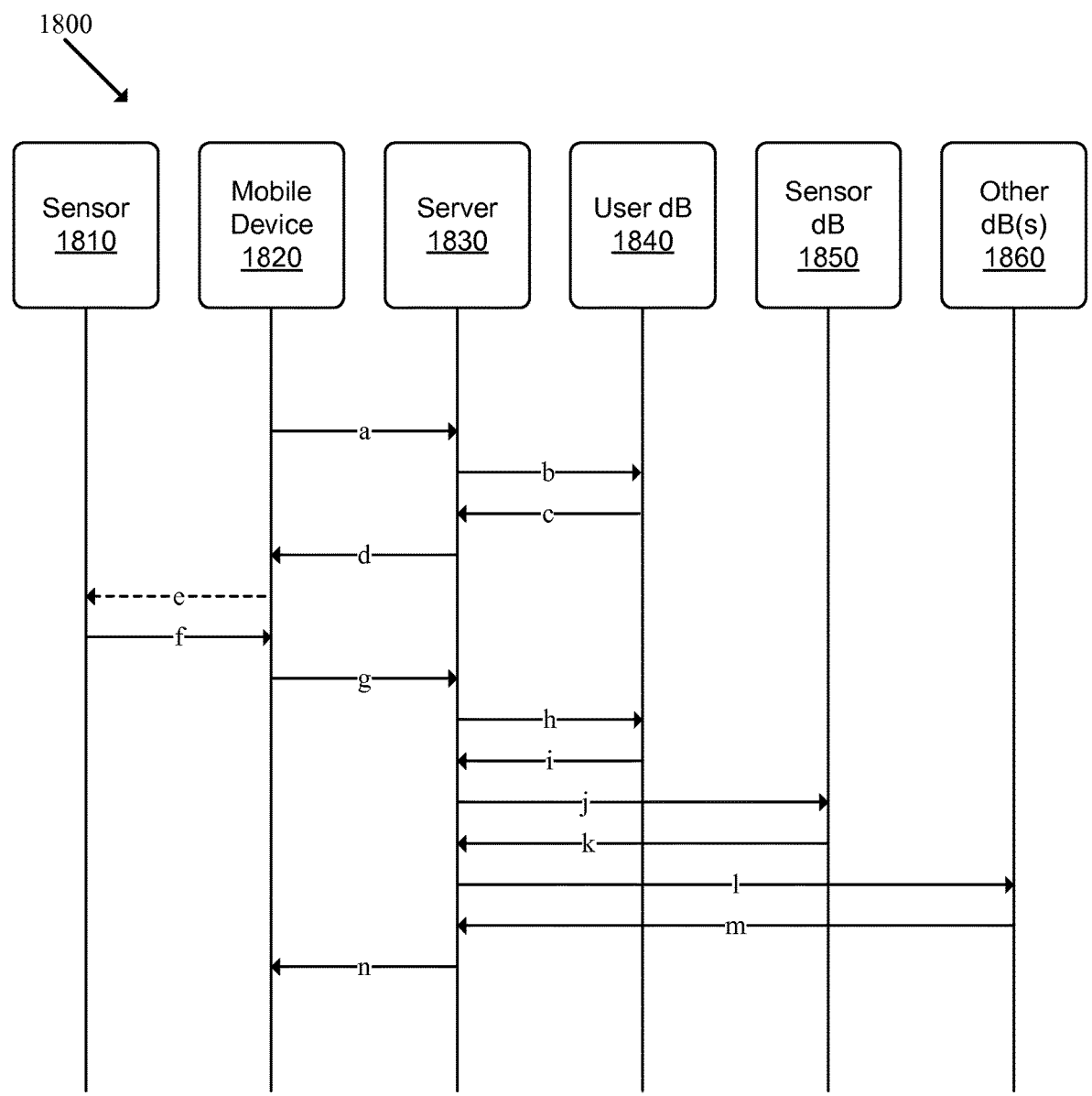
FIG. 18 illustrates a conceptual message flow diagram used by some embodiments of the invention to communicate among various elements of the system of FIG. 1.

FIG. 18 illustrates a conceptual message flow diagram 1800 used by some embodiments of the invention to communicate among various elements of the system 100. Specifically, this figure shows the message types and sequence of various communications sent among the components of the system. As shown, the message flow may include a sensor 1810, a mobile device 1820, a server 1830, a user database 1840, a sensor database 1850, and/or other databases 1860.

Sensor 1810 may be similar to sensor 300 described above in reference to FIG. 3. Mobile device 1820 may be a user device that includes one or more wireless communication features such as a smart phone, tablet, personal computer, etc. Server 1830 may include one or more remote devices that are able to communicate with various system elements (e.g., using one or more networks). User database 1840 may include various data elements related to a user of the system (e.g., username, password, shopping lists, etc.). Sensor database 1850 may include various data elements related to sensors provided by the system (e.g., sensor IDs, locations, etc.). The other databases 1860 may include various other data elements associated with the system (e.g., establishment IDs, manufacturer IDs, offers, usage statistics, etc.).

During operation, a consumer may use a mobile device, which may be running a client application, to trigger a proximity event. The example of FIG. 18 is for descriptive purposes, as many different message flows may be implemented, depending on various relevant factors (e.g., user preferences, placement of sensor(s), availability of network connections, etc.).

As shown, the mobile device 1820 may send a message 'a' to the server 1830. Such a message may include information such as a user name and password. The server may, in turn, send a message 'b' to the user database 1840. Such a message may be a request for a password or other information associated with the user. The user database may send a response message 'c' that may include the requested information. Next, the server 1830 may send a message 'd' to the mobile device 1820. Such a message may include various data items related to the user, the user's account, and/or other appropriate data. The messages 'a'-'d' may be used in some embodiments to establish a live session among a user device and the server(s) of some embodiments.

Next, the mobile device 1820 may send a message 'e' to the sensor 1810, which may trigger a response message 'f' from the sensor to the mobile device. Such a response message may include the ID of the sensor. Alternatively, the mobile device 1820 may receive message 'f' from the sensor 1810 without first transmitting message 'e'. For instance, when the mobile device receives a periodically transmitted beacon signal.

Next, the mobile device 1820 may send a message 'g' to the server 1830. Such a message may include information such as the sensor ID, identifying information regarding the user (e.g., username and password), and/or other appropriate information. The server 1830 may, in turn, send a message 'h' to the user database 1840 requesting information related to the user (e.g., user preferences, user history, etc.). The user database may respond with a message 'i' that includes the requested information. The server 1830 may then send a message 'j' to the sensor database 1850 requesting information related to the sensor (e.g., sensor location, associated establishment or manufacturer(s), etc.). The sensor database may respond with a message 'k' that includes the requested information. Next, the server 1830 may send a message 'l' to the other databases 1860 requesting other information (e.g., information regarding the establishment, the manufacturers, etc.). The other databases may respond with a message 'm' that includes the requested information. Finally, the server 1830 may send a message 'n' to the mobile device 1820. Such a message may be based on various received information. The server 1830 may determine the appropriate contents of the message (e.g., based on an offer associated with the establishment or manufacturer, information related to the user's history or preferences, etc.).

After sending the message 'n', the flow may end. Alternatively, messages 'e'-'n' or 'f'-'n' may be continuously repeated as the mobile device encounters other sensors, generating various proximity events.

One of ordinary skill in the art will recognize that the message flow described in reference to message flow diagram 1800 is conceptual in nature and may be implemented in various different ways without departing from the spirit of the invention. For instance, the messages may be sent or received in different orders. As another example, various messages may be omitted and/or other messages may be included. Furthermore, the message flow may be executed as part of a larger macro-flow, and/or divided into multiple sub-flows. Moreover, the message flow, or portions thereof, may be executed continuously, at regular intervals, based on certain criteria, and/or in other appropriate ways.

IV. Example Use Cases

The following sections will describe various use cases of specific example implementations that may use elements of the system, software, and/or methods described above. Such use cases are presented for example purposes only. One of ordinary skill in the art will recognize that different embodiments may implement various specific elements in various different ways.

In one example use case, multiple user devices may be used to collect information regarding a sensor. As each user device encounters a proximity event with the sensor, location information of the user device (e.g., a location determined using a GPS sub-system or application of the user device) may be sent to a server such that the approximate location of the sensor, and hence an object to which the sensor is attached, may be determined by aggregation of location reports transmitted by multiple user devices which were instructed by an application server to report their locations upon moving within a threshold proximity of the sensor. The server may store this information such that interested parties may review and analyze the information.

In another example use case of the present invention, a wireless sensor may be placed at a retail establishment. A mobile application may scan and detect the presence of a beacon signal transmitted by the wireless sensor. The mobile application, which may run on a user device may communicate with a server application. The server application may retrieve sensor data from a sensor database and user-specific data (e.g., gender, age group, ethnicity, income level, personal interests, etc.) from a user database and communicate with the mobile application to present a visual or audible targeted advertisement, sales coupon or special offer that matches a profile associated with the user. The advertisement may be extracted from a pool submitted by corporate marketing departments, merchants, and/or other appropriate parties that have installed wireless sensors at their premises or at common areas in shopping malls, strip malls, and/or other appropriate locations.

In yet another example use case of the present invention, one or more wireless sensors may be placed in, on, or about landmarks and tourist locations run by entities interested in providing information services to visitors on their user devices. When the user device moves within a threshold proximity of the wireless sensor(s), the user device may communicate with an application server which may consult a sensor database based on a sensor ID. The application server may send relevant information in the form of multimedia to the mobile application with instructions as to how to display such information to the user. The information received from the application server may include, for example, text, audio, and/or video that includes relevant information regarding the place or landmark where the wireless sensor is located.

In still another use case of the present invention, a wireless sensor may be installed in an inconspicuous location inside, for example, a vehicle, motorcycle, truck or asset. If the vehicle or asset is lost or stolen, a third-party may report the incident to an application server. The application server may instruct a mobile application to silently monitor for beacon signals from a wireless sensor with the identifier of the lost or stolen vehicle or asset and in the event of a positive scan, which means that the sensor has been found in the proximity of the user device, the mobile application may send location and time information to the application server which may then be used by the third-party to assist in the recovery of the stolen or missing vehicle or asset.

In another use case of the present invention, a wireless sensor may be placed at, for example, a concert venue, theater or park. A third-party may choose to distribute promotional material pertaining to the event occurring at the venue. The attendee to the event may then be instructed to use a user device to obtain such promotional material. A mobile application running on the mobile device may communicate with an application server. The application server may send relevant promotional information based on the sensor ID and the information may be displayed and perceived by any user that moves within a threshold proximity of the wireless sensor.

In yet another use case of the present invention, a wireless sensor may be attached to a particular article (e.g., an item of clothing). A consumer with a user device running a mobile application may move within a threshold proximity to the sensor, thus triggering a proximity event. Such an event may cause a server application to send information regarding the particular article to the user device (e.g., the cost of the article, the materials included in the article, the care requirements of the article, manufacturing processes (e.g., environmental friendliness, fair trade standing, etc.), etc.).

V. Processes for Defining Proximity Event Applications

FIGS. 19-22 describe processes that may be used to define sets of instructions for providing proximity event applications (e.g., a server application, a user application, a consumer application, etc.). In some cases such sets of instructions are defined in terms of object-oriented programming code. Some embodiments may include sets of instructions for defining classes and instantiating various objects at runtime based on the defined classes. The sets of instructions may be stored to an appropriate non-volatile storage medium. In some embodiments, multiple applications may be included on a single medium.

Figure 19:
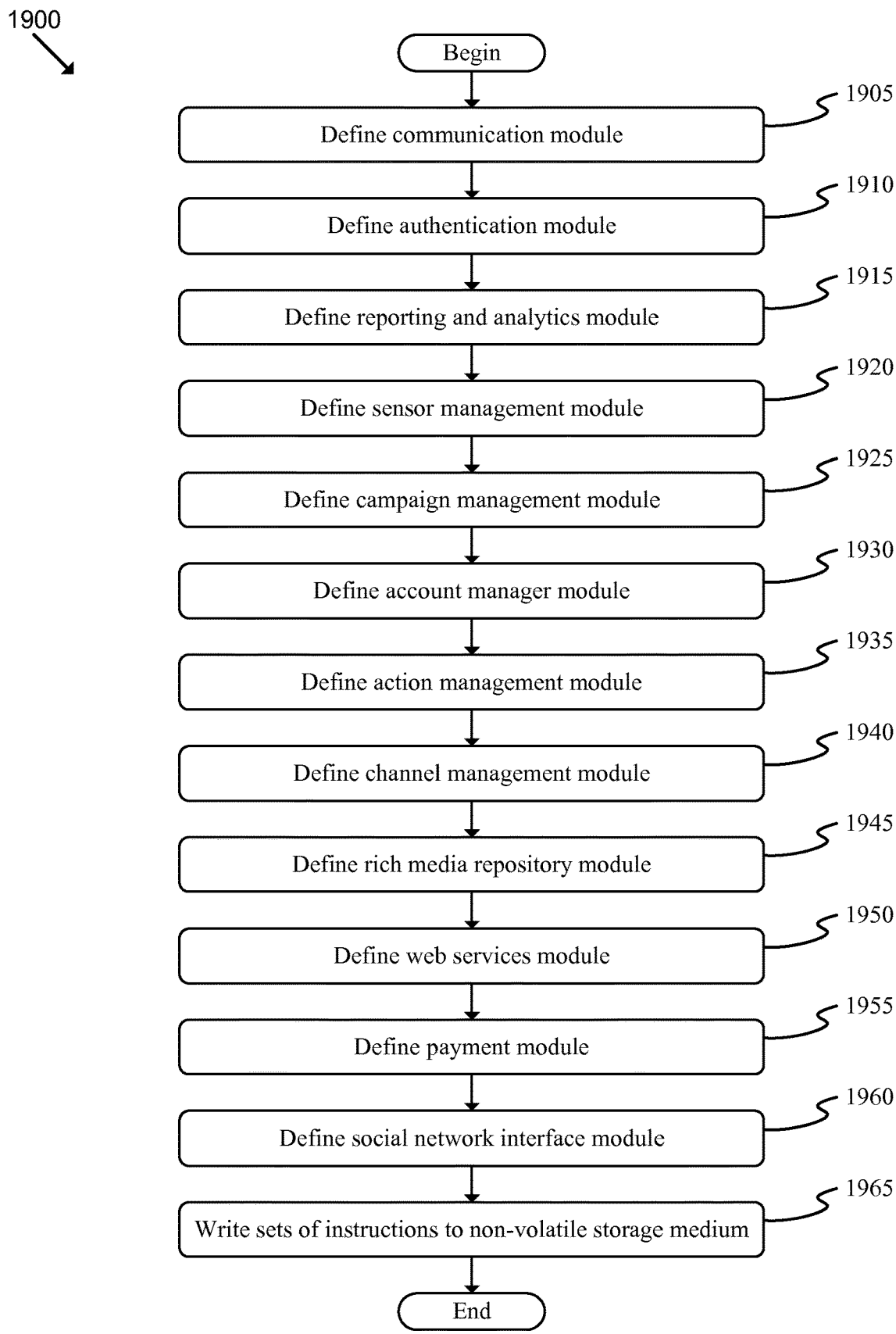
FIG. 19 conceptually illustrates a process of some embodiments for defining and storing a server-side application of some embodiments.

FIG. 19 conceptually illustrates a process 1900 of some embodiments for defining and storing a server-side application of some embodiments, such as application 600 described above in reference to FIG. 6. Specifically, process 1900 illustrates the operations used to define sets of instructions for providing several of the elements shown in the server application 600 and for performing various operations described above.

As shown, the process may define (at 1905) sets of instructions for providing a communication module. The process may then define (at 1910) sets of instructions for providing an authentication module. Next, the process may define (at 1915) sets of instructions for providing a reporting and analytics module. Process 1900 may then define (at 1920) sets of instructions for providing a sensor management module. The process then may define (at 1925) sets of instructions for providing a campaign management module. Next, the process may define (at 1930) sets of instructions for providing an account manager module.

Process 1900 may then define (at 1935) sets of instructions for providing an action management module. Next, the process may define (at 1940) sets of instructions for providing a channel management module. The process may then define (at 1945) sets of instructions for providing a rich media repository module. Process 1900 may then define (at 1950) sets of instructions for providing a web services module. Next, process 1900 may define (at 1955) sets of instructions for providing a payment module. The process may then define (at 1960) sets of instructions for providing a social network interface module. Process 1900 may then write (at 1965) the sets of instructions defined at operations 1905-1960 to a non-volatile storage medium.

Figure 20:
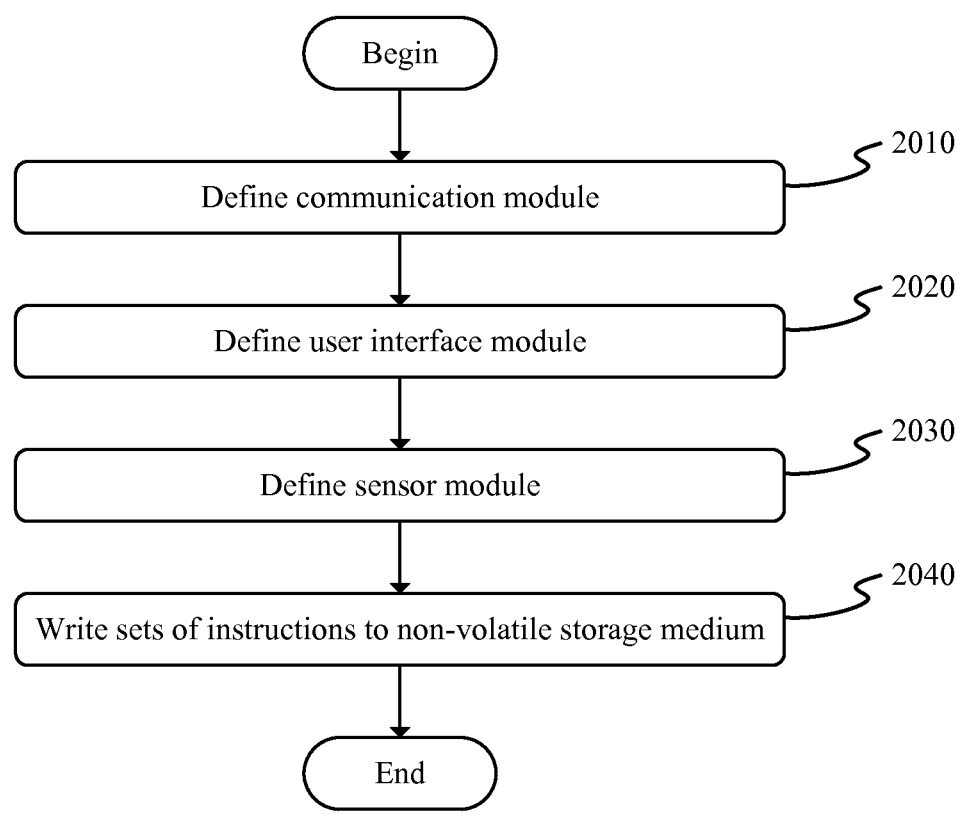
FIG. 20 conceptually illustrates a process of some embodiments for defining and storing a client-side user application of some embodiments.

FIG. 20 conceptually illustrates a process 2000 of some embodiments for defining and storing a client-side user application of some embodiments, such as application 700 described above in reference to FIG. 7. Specifically, process 2000 illustrates the operations used to define sets of instructions for providing several of the elements shown in the client-side user application 600 and for performing various operations described above.

As shown, the process may define (at 2010) sets of instructions for providing a communication module. The process may then define (at 2020) sets of instructions for providing a user interface module. Next, the process may define (at 2030) sets of instructions for providing a sensor module. Process 2000 may then write (at 2040) the sets of instructions defined at operations 2010-2030 to a non-volatile storage medium.

Figure 21:
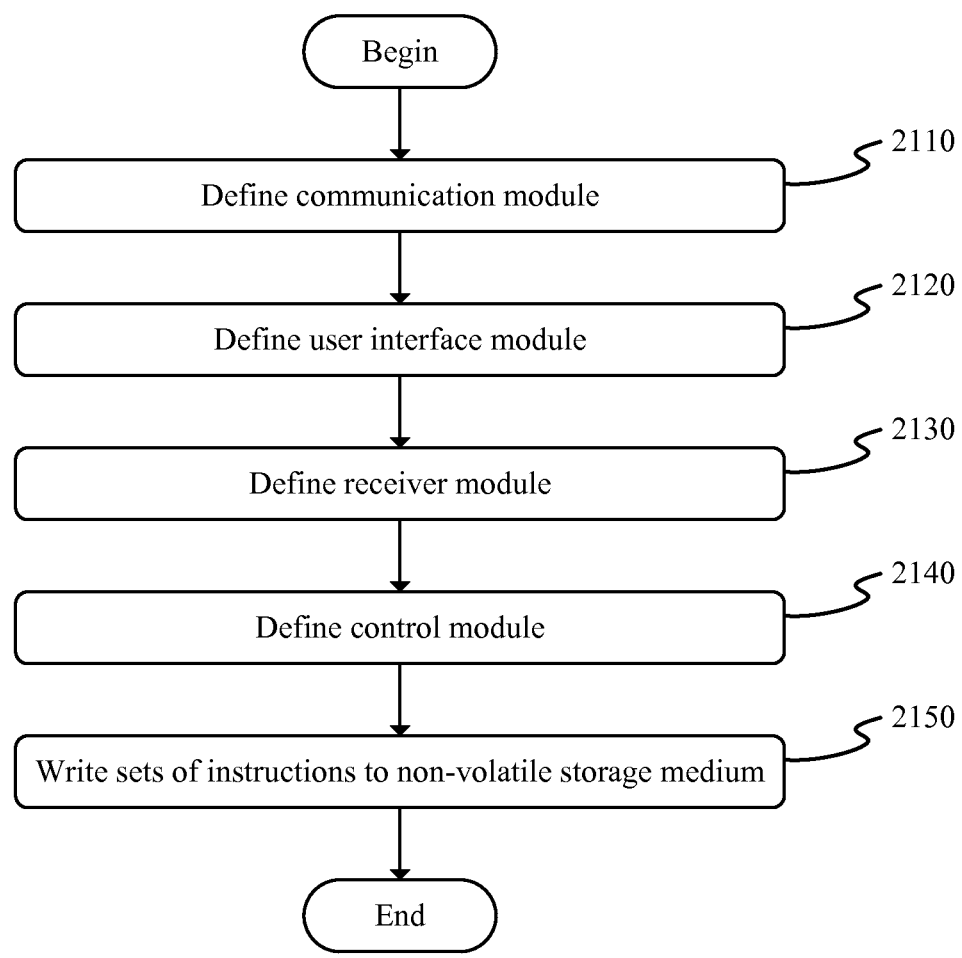
FIG. 21 conceptually illustrates a process of some embodiments for defining and storing a client-side consumer application of some embodiments.

FIG. 21 conceptually illustrates a process 2100 of some embodiments for defining and storing a client-side consumer application of some embodiments, such as application 800 described above in reference to FIG. 8. Specifically, process 2100 illustrates the operations used to define sets of instructions for providing several of the elements shown in the client-side application 800 and for performing various operations described above.

As shown, the process may define (at 2110) sets of instructions for providing a communication module. The process may then define (at 2120) sets of instructions for providing a user interface module. Next, the process may define (at 2130) sets of instructions for providing a receiver module. Process 2100 may then define (at 2140) sets of instructions for providing a control module. The process may then write (at 2150) the sets of instructions defined at operations 2110-2140 to a non-volatile storage medium.

Figure 22:
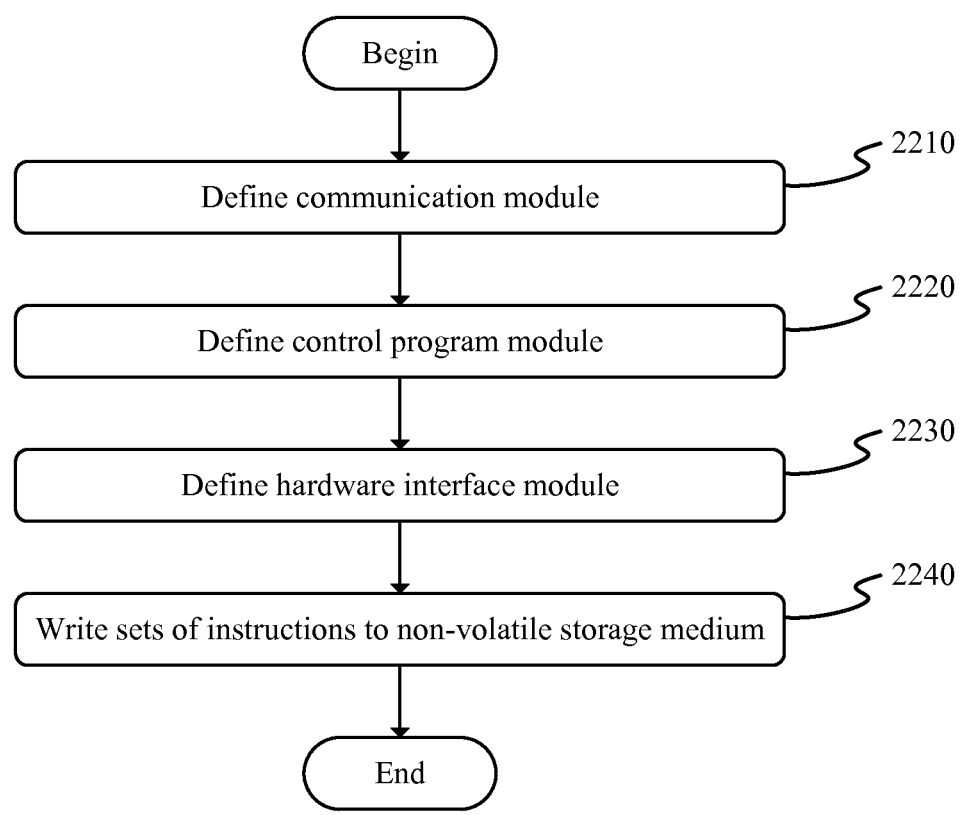
FIG. 22 conceptually illustrates a process of some embodiments for defining and storing a sensor application of some embodiments.

FIG. 22 conceptually illustrates a process 2200 of some embodiments for defining and storing a sensor application of some embodiments, such as application 900 described above in reference to FIG. 9. Specifically, process 2200 illustrates the operations used to define sets of instructions for providing several of the elements shown in the sensor application 900 and for performing various operations described above.

As shown, the process may define (at 2210) sets of instructions for providing a communication module. The process may then define (at 2220) sets of instructions for providing a control program module. Next, the process may define (at 2230) sets of instructions for providing a hardware interface module. The process may then write (at 2240) the sets of instructions defined at operations 2210-2230 to a non-volatile storage medium.

One of ordinary skill in the art will recognize that the various sets of instructions defined by processes 1900-2200 are not exhaustive of the sets of instructions that could be defined and established on a non-volatile storage medium for proximity event applications incorporating some embodiments of the invention. In addition, the processes 1900-2200 are conceptual processes, and the actual implementations may vary. For example, different embodiments may define the various sets of instructions in a different order, may define several sets of instructions in one operation, may decompose the definition of a single set of instructions into multiple operations, etc. In addition, the processes 1900-2200 may be implemented as several sub-processes or combined with other operations within a macro-process.

VI. Computer System

Many of the processes and modules described above may be implemented as software processes that are specified as at least one set of instructions recorded on a non-transitory storage medium. When these instructions are executed by one or more computational element(s) (e.g., microprocessors, microcontrollers, Digital Signal Processors ("DSP"), Application-Specific ICs ("ASIC"), Field Programmable Gate Arrays ("FPGA"), etc.) the instructions cause the computational element(s) to perform actions specified in the instructions.

Figure 23:
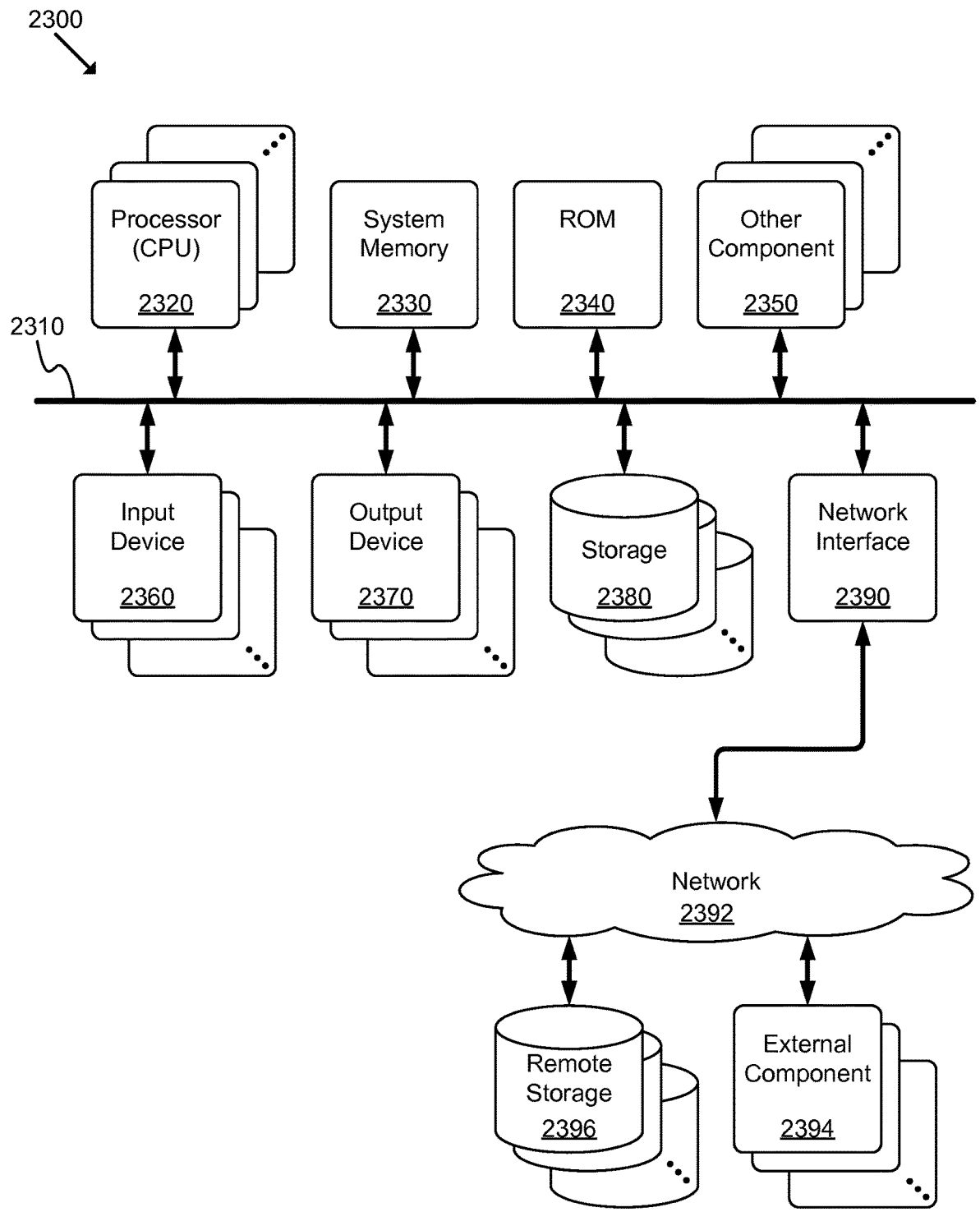
FIG. 23 illustrates a schematic block diagram of a conceptual computer system with which some embodiments of the invention may be implemented.

FIG. 23 conceptually illustrates a schematic block diagram of a computer system 2300 with which some embodiments of the invention may be implemented. For example, the system described above in reference to FIG. 1 may be at least partially implemented using computer system 2300. As another example, the processes described in reference to FIGS. 13-17 may be at least partially implemented using sets of instructions that are executed using computer system 2300.

Computer system 2300 may be implemented using various appropriate devices. For instance, the computer system may be implemented using one or more personal computers ("PC"), servers, mobile devices (e.g., a Smartphone), tablet devices, and/or any other appropriate devices. The various devices may work alone (e.g., the computer system may be implemented as a single PC) or in conjunction (e.g., some components of the computer system may be provided by a mobile device while other components are provided by a tablet device).

Computer system 2300 may include a bus 2310, at least one processing element 2320, a system memory 2330, a read-only memory ("ROM") 2340, other components (e.g., a graphics processing unit) 2350, input devices 2360, output devices 2370, permanent storage devices 2380, and/or a network connection 2390. The components of computer system 2300 may be electronic devices that automatically perform operations based on digital and/or analog input signals. For instance, the various examples of client and server applications described above in reference to FIGS. 6-8 may be at least partially implemented using sets of instructions that are run on computer system 2300.

Bus 2310 represents all communication pathways among the elements of computer system 2300. Such pathways may include wired, wireless, optical, and/or other appropriate communication pathways. For example, input devices 2360 and/or output devices 2370 may be coupled to the system 2300 using a wireless connection protocol or system. The processor 2320 may, in order to execute the processes of some embodiments, retrieve instructions to execute and data to process from components such as system memory 2330, ROM 2340, and permanent storage device 2380. Such instructions and data may be passed over bus 2310.

ROM 2340 may store static data and instructions that may be used by processor 2320 and/or other elements of the computer system. Permanent storage device 2380 may be a read-and-write memory device. This device may be a non-volatile memory unit that stores instructions and data even when computer system 2300 is off or unpowered. Permanent storage device 2380 may include a mass-storage device (such as a magnetic or optical disk and its corresponding disk drive).

Computer system 2300 may use a removable storage device and/or a remote storage device as the permanent storage device. System memory 2330 may be a volatile read-and-write memory, such as a random access memory ("RAM"). The system memory may store some of the instructions and data that the processor uses at runtime. The sets of instructions and/or data used to implement some embodiments may be stored in the system memory 2330, the permanent storage device 2380, and/or the read-only memory 2340. For example, the various memory units may include instructions for determining proximity to a sensor in accordance with some embodiments.

Other components 2350 may perform various other functions. These functions may include providing an interface to a physical sensor of some embodiments.

Input devices 2360 may enable a user to communicate information to the computer system and/or manipulate various operations of the system. The input devices may include keyboards, cursor control devices, audio input devices and/or video input devices. Output devices 2370 may include printers, displays, and/or audio devices. Some or all of the input and/or output devices may be wirelessly or optically connected to the computer system.

Finally, as shown in FIG. 23, computer system 2300 may be coupled to a network 2392 through a network adapter 2390. For example, computer system 2300 may be coupled to a web server on the Internet such that a web browser executing on computer system 2300 may interact with the web server as a user interacts with an interface that operates in the web browser.

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 2300 may be used in conjunction with the invention. Moreover, one of ordinary skill in the art will appreciate that many other system configurations may also be used in conjunction with the invention or components of the invention.

Moreover, while the examples shown may illustrate many individual modules as separate elements, one of ordinary skill in the art would recognize that these modules may be combined into a single functional block or element. One of ordinary skill in the art would also recognize that a single module may be divided into multiple modules.

While the invention has been described with reference to numerous specific details, one of ordinary skill in the art will recognize that the invention can be embodied in other specific forms without departing from the spirit of the invention. For example, several embodiments were described above by reference to particular features and/or components. However, one of ordinary skill in the art will realize that other embodiments might be implemented with other types of features and components. One of ordinary skill in the art would understand that the invention is not to be limited by the foregoing illustrative details, but rather is to be defined by the appended claims.

I claim:

1. A system that identifies and reacts to proximity events, the system comprising:
    a set of sensors, wherein each sensor in the set transmits a wireless beacon signal, the wireless beacon signal including a unique sensor identifier (ID) associated with the sensor, wherein each sensor in the set is associated with at least one zone within a particular establishment comprising a plurality of zones;
    at least one mobile device that receives the wireless beacon signal from the sensor and provides a location of the mobile device; and
    a server that:
        receives the location of the mobile device and the unique sensor ID;
        determines a location of the sensor based at least partly on the location of the mobile device;
        generates a message based at least partly on the received location and sensor ID; and
        sends the message to the mobile device.

2. The system of claim 1, wherein the wireless beacon signal comprises a Bluetooth signal.

3. The system of claim 1, wherein the wireless beacon signal comprises a WiFi signal.

4. The system of claim 1, wherein a plurality of sensors is associated with a particular zone.

5. The system of claim 1, wherein the message comprises sets of instructions for providing a multimedia display comprising a marketing offer to the mobile device.

6. A method that identifies and reacts to proximity events, the method comprising:
    transmitting a wireless beacon signal, the wireless beacon signal including a unique sensor identifier (ID) associated with a sensor;
    receiving a first response from a first mobile device, the first response based at least partly on the wireless beacon signal;
    determining a location of the first mobile device;
    determining a location of the sensor based at least partly on the location of the first mobile device;
    receiving a second response from a second mobile device, the second response based at least partly on the wireless beacon signal;
    determining a location of the second mobile device; and
    updating the location of the sensor based at least partly on the location of the second mobile device.

7. The method of claim 6, wherein the wireless beacon signal comprises a Bluetooth signal.

8. The method of claim 6, wherein the wireless beacon signal comprises a WiFi signal.

9. The method of claim 6, wherein each sensor is associated with a particular establishment.

10. The method of claim 6, wherein the message comprises sets of instructions for providing a multimedia display to the mobile device.

11. The method of claim 10, wherein the multimedia display comprises a marketing offer.

12. The method of claim 11, wherein the marketing offer is based at least partly on data associated with a user of the mobile device.

13. The method of claim 12, wherein the marketing offer comprises at least one of a loyalty reward, a coupon, and information about a product associated with the marketing offer.

14. A sensor device that identifies proximity events, the sensor comprising:
    a transmitter that broadcasts a beacon signal, wherein the beacon signal comprises an identifier that is unique to the sensor device;
    a receiver that receives a signal from a mobile device, the received signal comprising at least a location of the mobile device; and
    a control module that sends a message to a server based at least partly on the signal received from the mobile device, the message comprising a location of the sensor device.

15. The sensor device of claim 14, wherein the sensor device is associated with a particular establishment.

16. The sensor device of claim 14, wherein the sensor further comprises a communication module that sends multimedia content to a multimedia display to the mobile device.

17. The sensor device of claim 16, wherein the media content comprises a marketing offer.

18. The system of claim 1, wherein the server further determines an identification of the particular establishment based at least partly on the sensor ID.

19. The system of claim 1, wherein the server further receives a shopping list from the mobile device and determines whether an item on the shopping list is available in the at least one zone.

20. The system of claim 1, wherein each sensor is sensor is associated with a proximity zone defined by a range and a spread angle.

* * * * *